(12) United States Patent
Iida et al.

(10) Patent No.: US 10,761,194 B2
(45) Date of Patent: Sep. 1, 2020

(54) APPARATUS, METHOD FOR DISTANCE MEASUREMENT, AND NON-TRANSITORY COMPUTER-READABLE STORAGE MEDIUM

(71) Applicant: FUJITSU LIMITED, Kawasaki-shi, Kanagawa (JP)

(72) Inventors: Koichi Iida, Kobe (JP); Koichi Tezuka, Kobe (JP); Takeshi Morikawa, Yokohama (JP); Satoru Ushijima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 482 days.

(21) Appl. No.: 15/463,230

(22) Filed: Mar. 20, 2017

(65) Prior Publication Data

US 2017/0285146 A1 Oct. 5, 2017

(30) Foreign Application Priority Data

Mar. 29, 2016 (JP) ................................. 2016-066746

(51) Int. Cl.
*G01S 7/48* (2006.01)
*G01S 7/481* (2006.01)
*G01S 17/10* (2020.01)

(52) U.S. Cl.
CPC .......... *G01S 7/4817* (2013.01); *G01S 7/4808* (2013.01); *G01S 17/10* (2013.01)

(58) Field of Classification Search
CPC ...... G01S 7/4808; G01S 17/89; G01S 17/023; G01S 7/4868; G01S 17/42; G01S 7/4817; G01S 17/10
See application file for complete search history.

(56) References Cited

U.S. PATENT DOCUMENTS

| 2006/0017912 A1 | 1/2006 | Egawa |
| 2007/0165967 A1 | 7/2007 | Ando et al. |
| 2014/0169635 A1* | 6/2014 | Nishimura ........... G01B 11/026 |
| | | 382/106 |
| 2016/0259058 A1* | 9/2016 | Verheggen ............ G01S 7/4808 |

FOREIGN PATENT DOCUMENTS

| JP | 4-81677 A | 3/1992 |
| JP | 4-166783 | 6/1992 |
| JP | 2002-71808 | 3/2002 |
| JP | 2006-30147 | 2/2006 |
| JP | 2007-187618 | 7/2007 |
| JP | 2014-119428 | 6/2014 |

OTHER PUBLICATIONS

Japanese Office Action dated Dec. 17, 2019 from Japanese Patent Application No. 2016-066746, 15 pages.
Japanese Office Action dated Mar. 31, 2020 from Japanese Patent Application No. 2016-066746, 15 pages.

* cited by examiner

*Primary Examiner* — Luke D Ratcliffe
(74) *Attorney, Agent, or Firm* — Staas & Halsey LLP

(57) ABSTRACT

An apparatus for distance measurement includes: a memory; and a processor coupled to the memory and configured to execute a detection process that includes detecting a measurement target in a measurement range through two-dimensional scanning of a scan angle range with laser light, and execute a changing process that includes changing a width of the scan angle range with the laser light so that sampling density has a certain value or higher based on a distance and a bearing angle from the apparatus to the measurement target.

20 Claims, 20 Drawing Sheets

APPARATUS, METHOD FOR DISTANCE MEASUREMENT, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-066746, filed on Mar. 29, 2016, the entire contents of which are incorporated herein by reference.

FIELD

The embodiments discussed herein are related to an apparatus, a method for distance measurement, and a non-transitory computer-readable storage medium.

BACKGROUND

Scanning distance measurement apparatuses have been proposed, which measure distances to measurement targets with laser light and which are also called laser radar apparatuses. A typical distance measurement apparatus includes a light transmitting unit that performs two-dimensional scanning with laser light (or laser pulses) from, for example, a laser source that emits the laser light at predetermined intervals using a micro electro mechanical system (MEMS) mirror or the like and radiates the laser light. The distance measurement apparatus also includes a light receiving unit that detects light reflected from the measurement target with a photodetector in the scanning with the laser light by the light transmitting unit to calculate the distance from each scanning position to the measurement target.

Since, for example, raster scan is performed in which a scan angle range is scanned with laser light deflected with a mirror, the interval between sampling points (or focusing points) (hereinafter also referred to as a "sampling density") with the laser light is fixed within a measurement range with respect to a point a distance from the distance measurement apparatus. The sampling density with the laser light in the measurement range is increased with the decreasing distance from the distance measurement apparatus and is decreased with the increasing distance from the distance measurement apparatus. This is because, although a predetermined number of the sampling points are set in the measurement range, the measurement range is widened with the increasing distance from the distance measurement apparatus and is narrowed with the decreasing distance from the distance measurement apparatus.

The distance measurement apparatus is also applicable to detection of a living body, such as a human being, and an object, such as a vehicle. The distance measurement apparatus is capable of detecting an athlete, such as a gymnast or a basketball player, to measure the form of the athlete (for example, the form of a gymnastic performance or the form of a shoot of the basketball) or the like. The form or play of an athlete is capable of being analyzed based on the form measured by the distance measurement apparatus in the above manner.

In a case in which the measurement target is remote from the distance measurement apparatus, the measurement range is widened and the case is appropriate for, for example, detection of a play of a gymnast that is remote from the distance measurement apparatus. However, since the sampling density with the laser light is decreased, it is difficult to perform the measurement with high resolution. In addition, since the size of the measurement range and the sampling density are varied with the distance from the distance measurement apparatus to the measurement target, it is difficult to stably perform the measurement with high precision. For example, in a case in which the measurement target is close to the distance measurement apparatus and the measurement range is narrow, when the measurement target moves outside the measurement range even if the sampling density is high, the distance to the measurement target is not capable of being measured to reduce the measurement precision.

In contrast, setting the sampling density to a high value in order to perform the measurement with high resolution when the measurement target is remote from the distance measurement apparatus makes the sampling density when the measurement target is close to the distance measurement apparatus very high. In this case, since the light-emitting frequency is very high, the number of times of light emission from the laser source is increased to increase power consumption. As a result, for example, heat emission from the laser source may occur and the light emission is liable to be unstable. Accordingly, it is difficult to perform the measurement with high resolution when the measurement range is wide.

As examples of the related art, Japanese Laid-open Patent Publication No. 2014-119428 is known.

SUMMARY

According to an aspect of the invention, an apparatus for distance measurement includes: a memory; and a processor coupled to the memory and configured to execute a detection process that includes detecting a measurement target in a measurement range through two-dimensional scanning of a scan angle range with laser light, and execute a changing process that includes changing a width of the scan angle range with the laser light so that sampling density has a certain value or higher based on a distance and a bearing angle from the apparatus to the measurement target.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Since the measurement precision is dependent on the distance to the measurement target, as described above, it is difficult to stably perform the measurement with high precision. In addition, when the measurement precision is varied with the distance to the measurement target, it is difficult to accurately analyze the motion of the measurement target or track the motion of the measurement target based on the result of the measurement by the distance measurement apparatus.

Accordingly, a request to stably perform measurement with high precision by widening the measurement range and a request to perform measurement with high resolution by increasing the sampling density in the measurement range are made. The inventors have found that it is desirable to meet both of the requests especially when the motion of the measurement target is analyzed or the motion of the measurement target is tracked.

With the distance measurement apparatuses in related art, it is difficult to meet both the request to stably perform measurement with high precision by widening the measurement range and the request to perform measurement with high resolution by increasing the sampling density in the measurement range.

As one aspect of the present embodiment, provided are solutions for being able to meet both the request to stably perform measurement with high precision by widening the measurement range and the request to perform measurement with high resolution by increasing the sampling density in the measurement range.

According to a distance measurement apparatus, a distance measurement method, and a program of the present disclosure, a scan angle range is subjected to two-dimensional scanning with laser light to detect a measurement target in a measurement range. The size of the measurement range is changed so that the sampling density is has a certain value or higher in accordance with the distance and the bearing angle from the distance measurement apparatus to the measurement target.

Embodiments of the distance measurement apparatus, the distance measurement method, and the program of the present disclosure will herein be described with reference to the attached drawings.

First Embodiment

Figure 1:
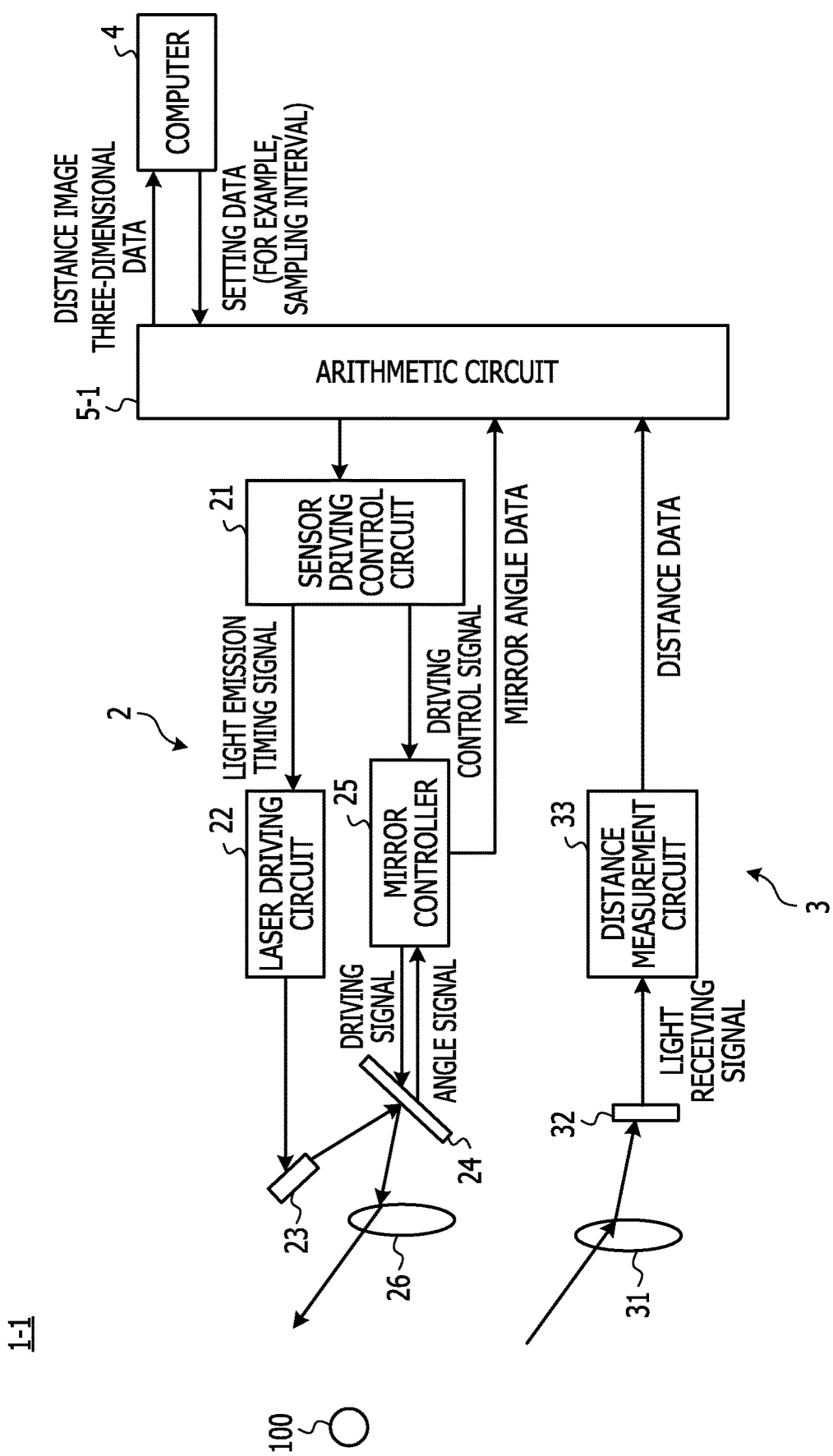
FIG. 1 illustrates an exemplary distance measurement apparatus according to a first embodiment.

FIG. 1 illustrates an exemplary distance measurement apparatus according to a first embodiment. The distance measurement apparatus illustrated in FIG. 1 includes a sensor main body 1-1 and a computer 4. The sensor main body 1-1 includes a light transmitting unit 2, a light receiving unit 3, and an arithmetic circuit 5-1.

The light transmitting unit 2 includes a sensor driving control circuit 21, a laser driving circuit 22, a laser diode 23, which is an exemplary laser source, a two-axis scanning mirror 24 formed of, for example, a two-dimensional MEMS mirror, a two-axis mirror controller 25, and a light transmitting lens 26. The sensor driving control circuit 21 supplies a light emission timing signal indicating light emission timing of the laser diode 23 to the laser driving circuit 22. The laser driving circuit 22 causes the laser diode 23 to emit light at the light emission timing indicated by the light emission timing signal. The sensor driving control circuit 21 supplies a driving control signal to drive the scanning mirror 24 with two axes to the mirror controller 25. The mirror controller 25 outputs a driving signal to drive the scanning mirror 24 with the two axes in accordance with the driving control signal and drives the scanning mirror 24 with a known driving unit (not illustrated). The mirror angle of the scanning mirror 24 is detected with a known detection unit (not illustrated) and the scanning mirror 24 supplies an angle signal indicating the mirror angle to the mirror controller 25. The scanning mirror 24 is illustrated in a form including the driving unit and the detection unit described above in FIG. 1 for convenience. The mirror controller 25 generates mirror angle data indicating the mirror angle of the scanning mirror 24 in accordance with the angle signal and supplies the generated mirror angle data to the arithmetic circuit 5-1. For example, the raster scan is performed in the above manner, in which the scan angle range is scanned with the laser light that is emitted from the laser diode 23 and that is deflected by the scanning mirror 24 via the light transmitting lens 26.

In the raster scan described above, the measurement range is scanned with the laser light (or laser pulses) at a position a distance from the sensor main body 1-1. This measurement range has a width corresponding to the distance in which the laser light moves substantially parallel to, for example, a horizontal plane (or ground) from one end of the scan angle range to the other end thereof at a position a distance from the sensor main body 1-1 and a height corresponding to the distance in which the laser light moves in a direction vertical to the horizontal plane, for example, from the bottom to the top at a position a distance from the sensor main body 1-1. In other words, the measurement range means the entire area scanned with the laser light at a position a distance from the sensor main body 1-1. Accordingly, when the light emission timing of the laser light is fixed, the measurement range is narrowed and the sampling density in the measurement range is increased with the decreasing distance from the sensor main body 1-1. In contrast, when the light emission timing of the laser light is fixed, the measurement range is widened and the sampling density in the measurement range is decreased with the increasing distance from the sensor main body 1-1.

The light receiving unit 3 includes a light receiving lens 31, a photodetector 32, and a distance measurement circuit 33. Light reflected from a measurement target 100 is detected by the photodetector 32 via the light receiving lens 31. The photodetector 32 supplies a light receiving signal indicating the detected reflected light to the distance measurement circuit 33. The distance measurement circuit 33 measures a time of flight (TOF) $\Delta T$ from a time when the laser light is emitted from the light transmitting unit 2 to a time when the laser light is reflected from the measurement target 100 and is returned to the light receiving unit 3 to optically measure the distance to the measurement target 100 and supplies distance data indicating the measured distance to the arithmetic circuit 5-1. The distance to the measurement target 100 is calculated by, for example, $(c \times \Delta T)/2$ where c denotes a velocity of light (about 300,000 km/s).

Figure 2:
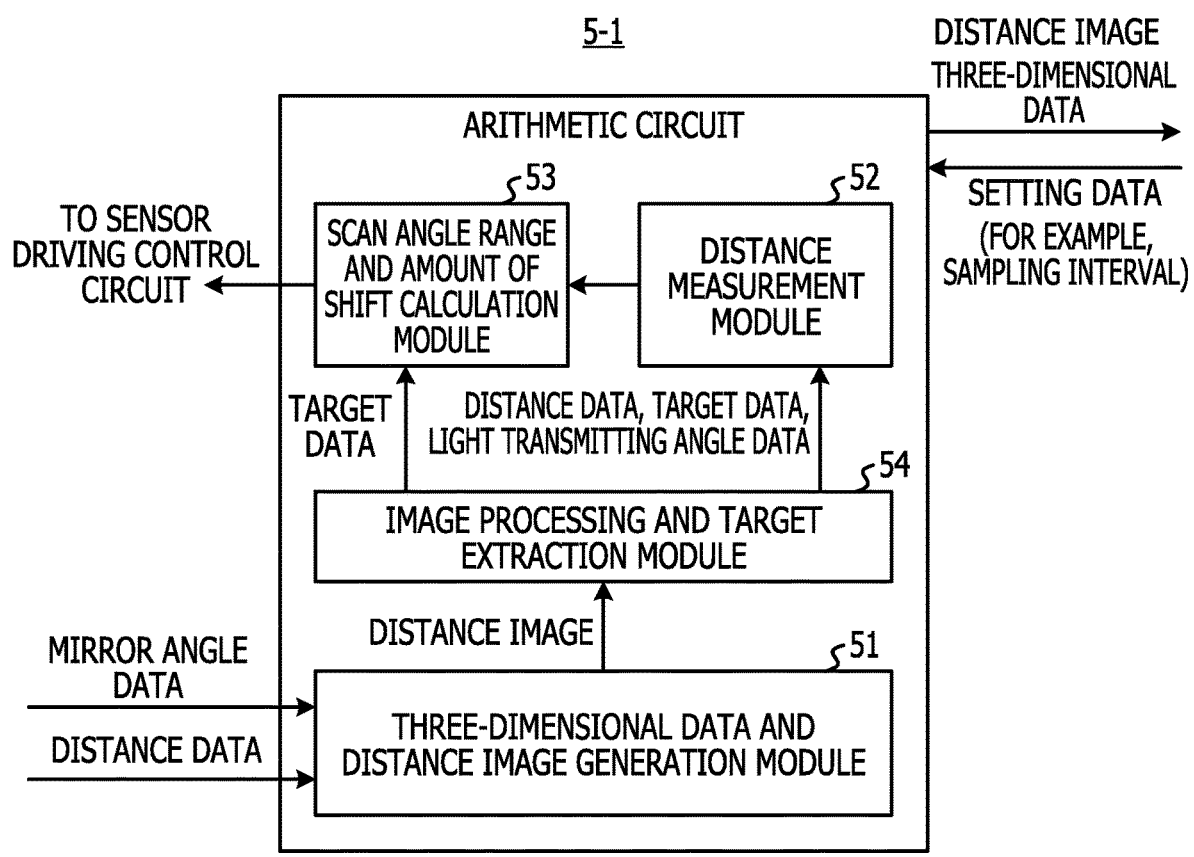
FIG. 2 is a functional block diagram illustrating an example of an arithmetic circuit illustrated in FIG. 1.

FIG. 2 is a functional block diagram illustrating an example of the arithmetic circuit illustrated in FIG. 1. The arithmetic circuit 5-1 may be composed of, for example, a processor. The processor executes programs stored in a memory to perform the functions of modules 51 to 54 illustrated in FIG. 2. In the example in FIG. 2, the arithmetic circuit 5-1 includes a three-dimensional data and distance image generation module 51, a distance measurement module 52, a scan angle range and amount of shift calculation module 53, and an image processing and target extraction module 54. The arithmetic circuit 5-1 is an example of a changing unit that changes the measurement range so that the sampling density has a certain value or higher based on the measured distance to the measurement target and the detected bearing of the measurement target. The change of the measurement range means widening and narrowing the size of the measurement range. The size of the measurement range is widened by increasing the width of the scan angle range and is narrowed by decreasing the width of the scan angle range.

The three-dimensional data and distance image generation module 51 is an example of a distance image generating unit that receives the mirror angle data and the distance data, generates a distance image from the distance data, and generates three-dimensional data from the distance image and the mirror angle data. In addition, the three-dimensional data and distance image generation module 51 generates light transmitting angle data indicating a light transmitting angle of the laser light from the mirror angle data. The distance image is an image in which the distance values at the respective focusing points are arranged in the order of samples subjected to the raster scan. The three-dimensional data is capable of being generated through conversion using the distance values and the light transmitting angle data. The three-dimensional data may be supplied to the computer 4. The distance image may also be supplied to the computer 4.

The image processing and target extraction module 54 is an example of a target extracting unit that extracts the measurement target 100 from the distance image when the measurement target 100 exists in the scan angle range subjected to the raster scan. The method of extracting the measurement target 100 from the distance image is not specifically limited and the measurement target 100 may be extracted using, for example, a known method. For example, when the measurement target 100 is a human being, the measurement target 100 is capable of being extracted by detecting a form, such as a posture, of the human being from the distance image. As another example of how to specify the target, an extraction method may be used in which the acquired distance image or a three-dimensional image is displayed on a screen of a display and a desired position on the screen is specified (clicked) or a range is specified with a mouse or the like. The image processing and target extraction module 54 supplies the light transmitting angle data, the distance data, and data about the extracted measurement target 100 (hereinafter also referred to as "target data") to the distance measurement module 52 and supplies the target data to the scan angle range and amount of shift calculation module 53.

The distance measurement module 52 is an example of a distance and bearing calculating unit that calculates the distance to a centroid position of the measurement target 100 from the extracted target data and calculates the bearing angle to, for example, the centroid position of the measurement target 100 from the light transmitting angle data and the extracted target data. The method of calculating the centroid of the measurement target 100 is not specifically limited and the centroid of the measurement target 100 may be calculated using, for example, a known method. The method of calculating the bearing angle to the measurement target 100 is not specifically limited and the bearing angle to the measurement target 100 may be calculated using, for example, a known method.

The scan angle range and amount of shift calculation module 53 calculates setting values of the scan angle range and the amount of shift of the scan angle range so that a desired sampling interval (that is, a desired sampling density) supplied from the computer 4 in advance is achieved and the measurement target 100 is detected near the center of the scan angle range, based on the distance and the bearing angle to the centroid position of the measurement target 100. The scan angle range and amount of shift calculation module 53 supplies the setting values to the sensor driving control circuit 21 and goes to the next measurement. Shifting the scan angle range enables the center of the scan angle range to be shifted to change the area covered with the scan angle range. As described above, the scan angle range and amount of shift calculation module 53 is an example of a setting unit that sets in the sensor driving control circuit 21 a mirror driving condition for supplying the driving control signal used to drive the scanning mirror 24 with two axes to the mirror controller 25. The arithmetic circuit 5-1 is capable of performing the measurement in which the interval between sampling points (or focusing points) (that is, the sampling interval) with the laser light has a certain value or higher even if the distance to the measurement target 100 is changed by repeating the above process. The sampling interval is hereinafter also referred to as the "sampling density".

However, the measurement may be performed in a maximum scan angle range if the distance to be measured is shortened and the scan angle range exceeds the maximum scan angle range (that is, a maximum operation angle range of the scanning mirror 24). In addition, if the amount of shift of the scan angle range is increased and one side of the scan angle range exceeds the corresponding side of the maximum operation angle range (that is, an operation limit), the amount of shift may be decreased with priority given to the position of the operation limit of the maximum operation angle range. Such control is capable of being performed with the scan angle range and amount of shift calculation module 53. As a result, it is possible to inhibit the scanning mirror 24 from being damaged due to excessive driving.

When the measurement target 100 does not appear in the scan angle range, the image processing and target extraction module 54 does not output the target data. In this case, the scan angle range and amount of shift calculation module 53 may reset the scan angle range to, for example, the maximum scan angle range and may perform the scanning in the maximum scan angle range.

Figure 3:
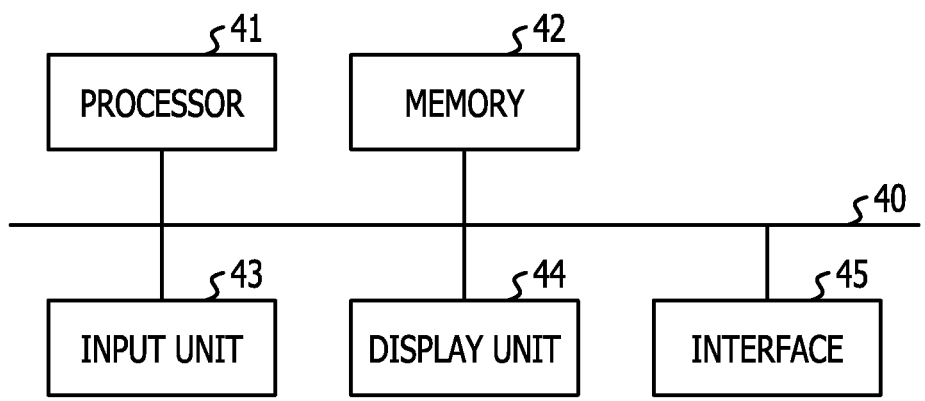
FIG. 3 is a block diagram illustrating an exemplary computer.

The computer 4 may have a configuration illustrated in FIG. 3. FIG. 3 is a block diagram illustrating an exemplary computer. The computer 4 illustrated in FIG. 3 includes a processor 41, a memory 42, an input unit 43, a display unit 44, and an interface (or communication unit) 45, which are connected to each other via a bus 40. The processor 41 may be composed of, for example, a central processing unit (CPU) and executes programs stored in the memory 42 to control the entire computer 4. The memory 42 may be composed of a computer-readable recording medium, such as a semiconductor storage unit, a magnetic recording medium, an optical recording medium, or a magneto-optical recording medium. The memory 42 stores various programs including a distance measurement program executed by the processor 41, a variety of data, and so on.

The input unit 43 may be composed of, for example, a keyboard operated by a user (or an operator) and is used by the user (or the operator) to input a command and data into the processor 41. The display unit 44 displays, for example, a message for the user and the measurement result of a distance measurement process. The interface 45 is used to connect the computer 4 so as to be capable of communication. In the example in FIG. 3, the computer 4 is connected to the arithmetic circuit 5-1 via the interface 45.

The computer 4 is not limited to a hardware configuration in which the components in the computer 4 are connected to each other via the bus 40. For example, a general-purpose computer may be used as the computer 4.

The input unit 43 and the display unit 44 in the computer 4 may be removed. In the case of, for example, a module or a semiconductor chip in which the interface 45 in the computer 4 is also removed, the output of a sensor main body 1 (that is, the output of the arithmetic circuit 5-1) may be connected to the bus 40 or may be directly connected to the processor 41. The sensor main body 1-1 and a sensor main body 1-2 described below are collectively referred to as the sensor main body 1. For example, when the computer 4 is composed of, for example, a semiconductor chip, the semiconductor chip may be provided in the sensor main body 1. The computer 4 may include, for example, the arithmetic circuit 5-1. In this case, the computer 4 (that is, the processor 41 and the memory 42) is appropriately converted into a hardware circuit for performing a changing process of executing the programs according to the first embodiment to change the measurement range so that the sampling density has a certain value or higher based on the measured distance to the measurement target and the detected bearing of the measurement target.

Figure 4:
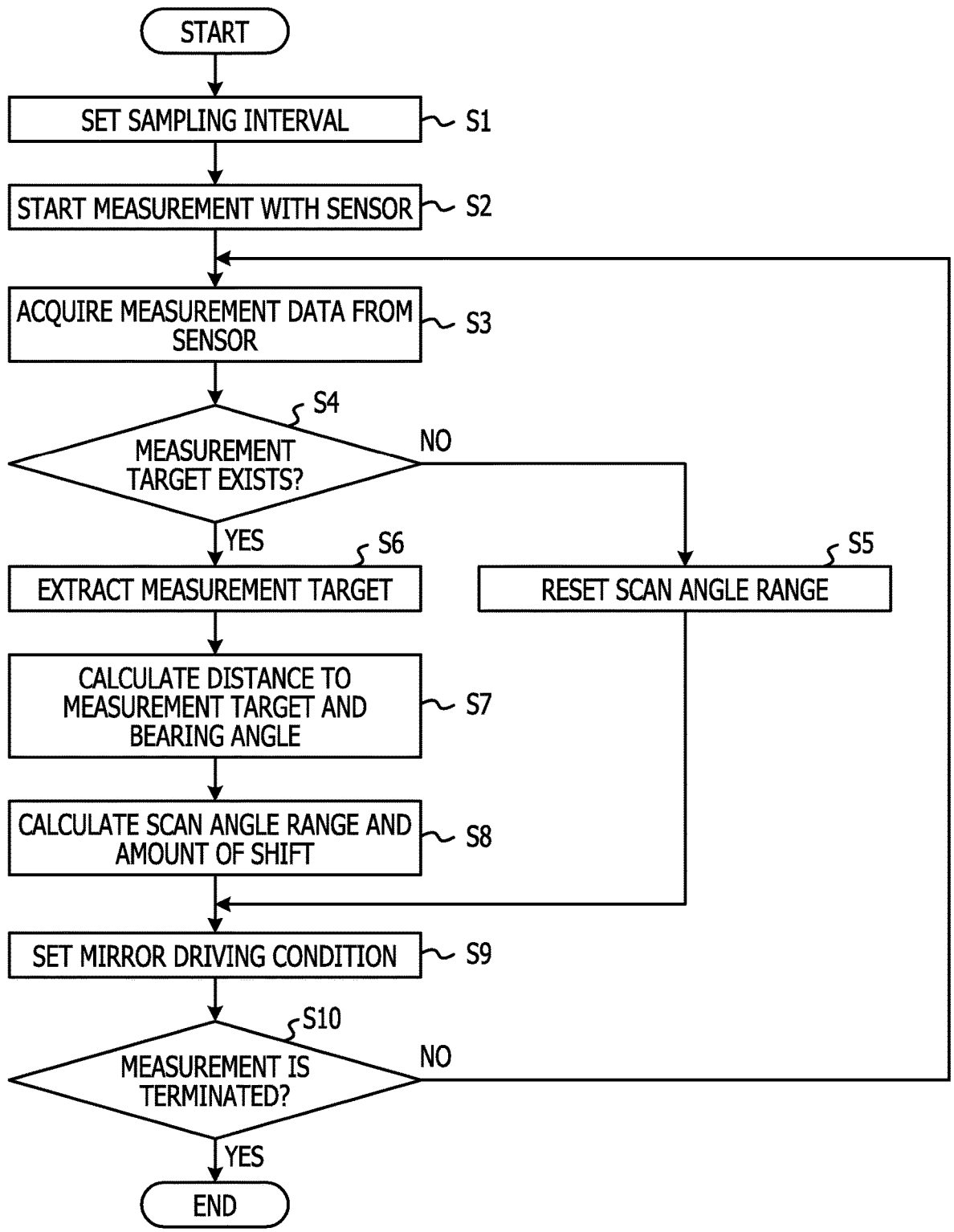
FIG. 4 is flowchart illustrating an example of a distance measurement process in the first embodiment.

FIG. 4 is a flowchart illustrating an example of the distance measurement process in the first embodiment. Referring to FIG. 4, in Step S1, the computer 4 starts the distance measurement process and sets setting data including the sampling interval (sampling density). In Step S2, the computer 4 starts measurement with the sensor main body 1-1.

In Step S3, the three-dimensional data and distance image generation module 51 in the arithmetic circuit 5-1 acquires measurement data from the sensor main body 1-1. The measurement data to be acquired includes the distance data from the distance measurement circuit 33 and the mirror angle data from the mirror controller 25. Accordingly, the three-dimensional data and distance image generation module 51 generates the three-dimensional data from the distance data, generates the distance image from the three-dimensional data, and generates the light transmitting angle data from the mirror angle data in Step S3. The three-dimensional data may be supplied to the computer 4.

In Step S4, the image processing and target extraction module 54 in the arithmetic circuit 5-1 determines whether the measurement target 100 exists in the scan angle range subjected to the raster scan. If the determination is negative (NO in Step S4), the process goes to Step S5. If the determination is affirmative (YES in Step S4), the process goes to Step S6. Whether the measurement target 100 exists in the scan angle range subjected to the raster scan may be determined using a known method.

In Step S5, the scan angle range and amount of shift calculation module 53 in the arithmetic circuit 5-1 resets the scan angle range to the maximum scan angle range because no target data is output from the image processing and target extraction module 54. Then, the process goes to Step S9 described below. In Step S6, the image processing and target extraction module 54 in the arithmetic circuit 5-1 extracts the measurement target 100 from the distance image when the measurement target 100 exists in the scan angle range subjected to the raster scan and acquires the target data about the extracted measurement target 100.

In Step S7, the distance measurement module 52 in the arithmetic circuit 5-1 calculates the distance and the bearing angle to the centroid position of the measurement target 100 from the acquired target data and the light transmitting angle data and may store the distance and the bearing angle to the centroid position of the measurement target 100.

In Step S8, the scan angle range and amount of shift calculation module 53 in the arithmetic circuit 5-1 calculates the setting values of the scan angle range and the amount of shift of the scan angle range so that a desired sampling density supplied from the computer 4 in advance is achieved based on the distance and the bearing angle to the centroid position of the measurement target 100 calculated or stored in Step S7. In Step S9, the scan angle range and amount of shift calculation module 53 in the arithmetic circuit 5-1 sets in the sensor driving control circuit 21 the mirror driving condition for supplying the driving control signal used to drive the scanning mirror 24 with two axes to the mirror controller 25. Specifically, the scan angle range and amount of shift calculation module 53 supplies the calculated setting values of the scan angle range and the amount of shift of the scan angle range to the sensor driving control circuit 21. When the scan angle range is reset in Step S5, the scan angle range and amount of shift calculation module 53 sets the mirror driving condition based on the reset scan angle range in Step S9.

In Step S10, the computer 4 determines whether the distance measurement process is terminated. If the determination is negative (NO in Step S10), the process goes back to Step S3. If the determination is affirmative (YES in Step S10), the process illustrated in FIG. 4 is terminated. Accordingly, repeating the distance measurement process until the determination result in Step S10 is affirmative enables the measurement in which the sampling interval has a certain value or higher to be performed even when the distance to the measurement target 100 is changed.

According to the first embodiment, the distance to the measurement target is capable of being measured at the sampling density having a certain value or higher in the measurement range even when the distance to the measurement target is changed. Accordingly, it is possible to meet both a request to stably perform measurement with high precision by widening the measurement range and a request to perform measurement with high resolution by increasing the sampling density in the measurement range.

Second Embodiment

A distance measurement apparatus according to a second embodiment has the same configuration as that of the distance measurement apparatus according to the first embodiment described above with reference to FIG. 1 to FIG. 3. In the second embodiment, when the measurement target 100 does not appear in the scan angle range, a position (or an existence range) where the measurement target 100 will be exist is estimated from past results of measurement and the scan angle range is determined based on the estimation. The past results of measurement are the results of measurement of, for example, the centroid position of the measurement target 100, which was measured before the measurement target 100 does not appear in the scan angle range. In order to estimate the position (or the existence range) where the measurement target 100 will be exist, for example, the image processing and target extraction module 54 mathematizes (for example, linearly predicts) the centroid position of the measurement target 100 estimated from the last several-times (for example, three-times) results of measurement before the measurement target 100 does not appear in the scan angle range, which are stored in the distance measurement module 52, to estimate the centroid position of the measurement target 100. Specifically, centroid coordinates G1, G2, and G3 of the measurement target 100, which are estimated from the last three-times results of measurement, are set to, for example, G1 (X1, Y1, Z1), G2 (X2, Y2, Z2), and G3 (X3, Y3, Z3) in time series and the relationship G(t)=(Xt, Yt, Zt) of the centroid coordinate with respect to time is calculated using a least square method or the like. The scan angle range and the amount of shift are capable of being determined using the result of the estimation. When the measurement has been performed at the estimated position and the measurement target 100 does not exist in the scan angle range, the scan angle range is reset to the maximum scan angle range and the scanning is performed in the maximum scan angle range of the sensor main body 1-1.

Figure 5:
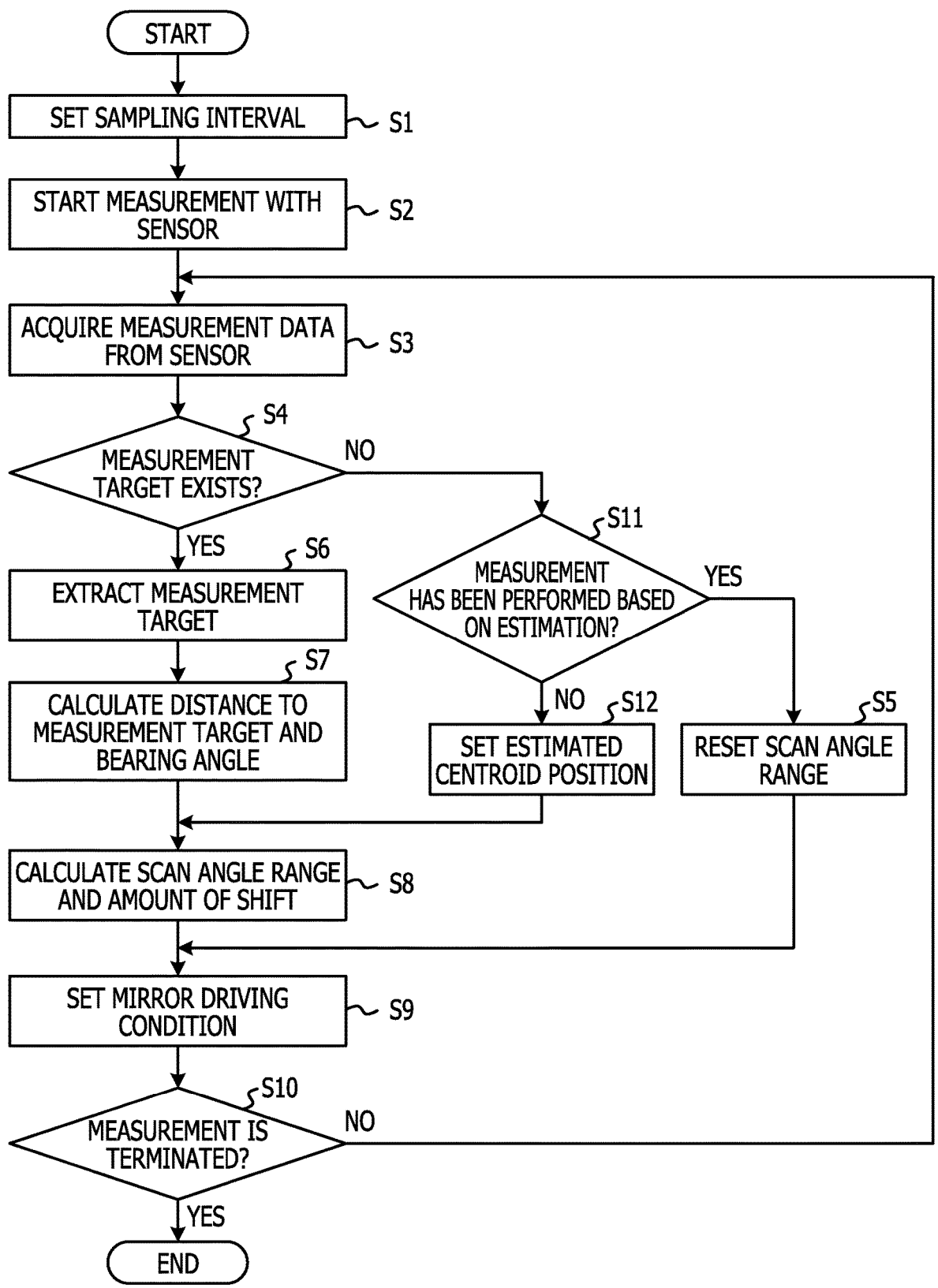
FIG. 5 is a flowchart illustrating an example of a distance measurement process in a second embodiment.

FIG. 5 is a flowchart illustrating an example of a distance measurement process in the second embodiment. The same step numbers are used in FIG. 5 to identify the same steps as in FIG. 4 and a description of such steps is omitted herein. Referring to FIG. 5, in Step S11, the image processing and target extraction module 54 in the arithmetic circuit 5-1 determines whether the measurement has been performed based on the estimation. If the determination is affirmative (YES in Step S11), the process goes to Step 5. If the determination is negative (NO in Step S11), the process goes to Step 12. Whether the measurement has been performed based on the estimation may be based on, for example, an estimation measurement setting included in the setting data supplied from the computer 4. In Step S12, the image processing and target extraction module 54 in the arithmetic circuit 5-1 mathematizes (for example, linearly predicts) the centroid position of the measurement target 100 estimated from the last several-times (for example, three-times) results of measurement before the measurement target 100 does not appear in the scan angle range, which are stored in the distance measurement module 52, to estimate the centroid position of the measurement target 100. After Step S12, the process goes to Step S8. In this case, in Step S8, the scan angle range and amount of shift calculation module 53 in the arithmetic circuit 5-1 calculates the setting values of the scan angle range and the amount of shift of the scan angle range so that a desired sampling density supplied from the computer 4 in advance is achieved based on the distance and the bearing angle to the estimated centroid position of the measurement target 100.

According to the second embodiment, in addition to the advantages in the first embodiment, it is possible to also support the case in which the measurement target does not appear in the scan angle range by estimating the position (or the existence range) of the measurement target from the past results of measurement.

Third Embodiment

A distance measurement apparatus according to a third embodiment has the same configuration as that of the distance measurement apparatus according to the first embodiment described above with reference to FIG. 1 to FIG. 3. In the third embodiment, a position (or an existence range) where the measurement target 100 will be exist is continuously estimated from several-times (for example, three-times) results of measurement and the scan angle range is determined based on the estimation. The results of measurement are the results of measurement of, for example, the centroid position of the measurement target 100. In order to estimate the position (or the existence range) where the measurement target 100 will be exist, for example, the image processing and target extraction module 54 mathematizes (for example, linearly predicts) the centroid position of the measurement target 100 estimated from the last several-times (for example, three-times) results of measurement before the measurement target 100 does not appear in the scan angle range to estimate the centroid position of the measurement target 100, as in the second embodiment. The scan angle range and the amount of shift are capable of being determined using the result of the estimation. When the measurement has been performed at the estimated position and the measurement target 100 does not exist in the scan angle range, the scan angle range is reset to the maximum scan angle range and the scanning is performed in the maximum scan angle range of the sensor main body 1-1.

Figure 6:
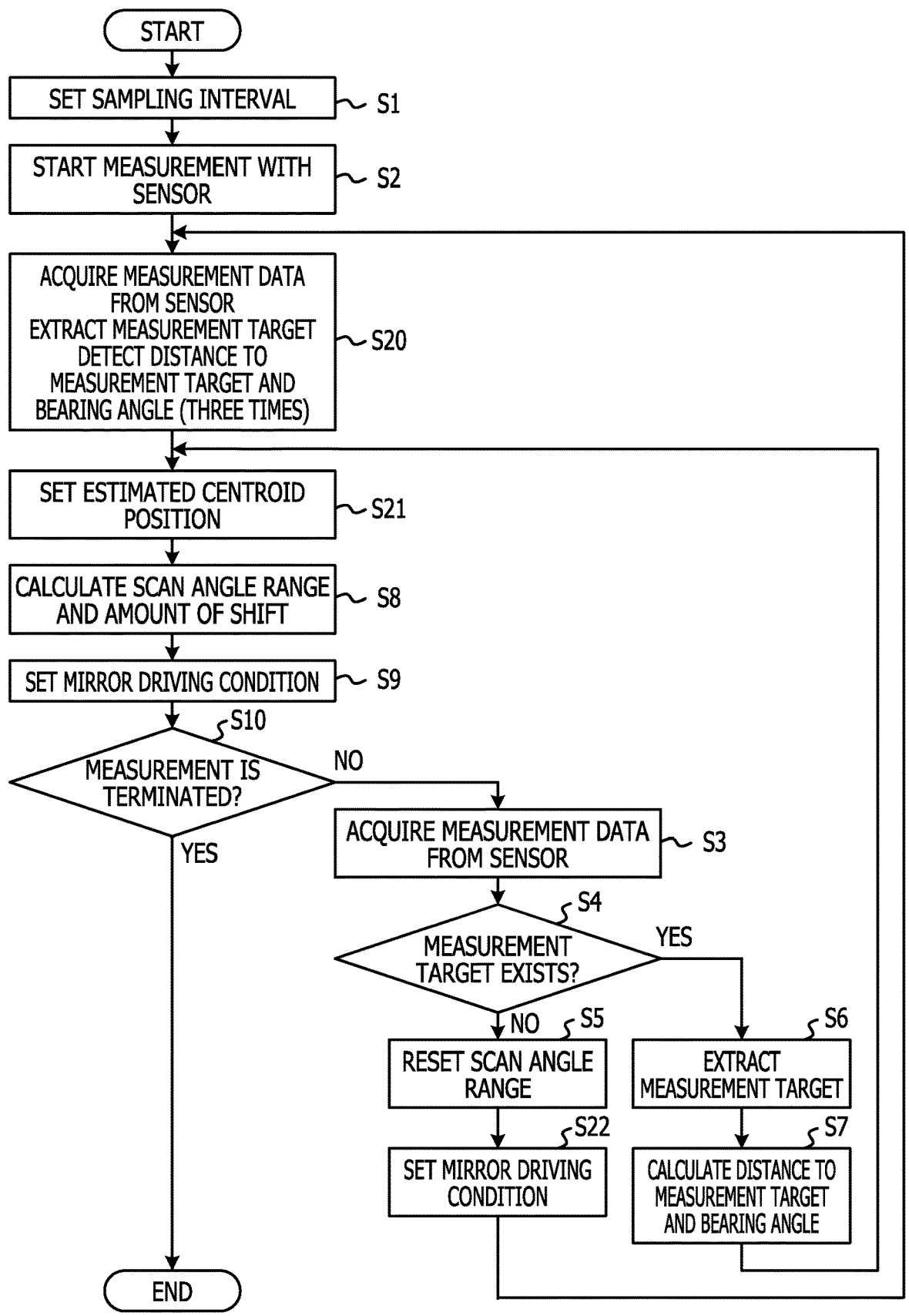
FIG. 6 is a flowchart illustrating an example of a distance measurement process in a third embodiment.

FIG. 6 is a flowchart illustrating an example of a distance measurement process in the third embodiment. The same step numbers are used in FIG. 6 to identify the same steps as in FIG. 4 and a description of such steps is omitted herein. Referring to FIG. 6, in Step S20, the three-dimensional data and distance image generation module 51 in the arithmetic circuit 5-1 performs the same step as Step S3 in FIG. 4, the image processing and target extraction module 54 in the arithmetic circuit 5-1 performs the same step as Step S6 in FIG. 4, and the distance measurement module 52 in the arithmetic circuit 5-1 performs the same step as Step S7 in FIG. 4. For example, the three-time results of measurement are stored. In Step S21, the image processing and target extraction module 54 in the arithmetic circuit 5-1 mathematizes (for example, linearly predicts) the centroid position of the measurement target 100 estimated from the three-times results of measurement to estimate the centroid position of the measurement target 100. Then, the process goes to Step 8. In this case, in Step S8, the scan angle range and amount of shift calculation module 53 in the arithmetic circuit 5-1 calculates the setting values of the scan angle range and the amount of shift of the scan angle range so that a desired sampling density supplied from the computer 4 in advance is achieved based on the distance and the bearing angle to the estimated centroid position of the measurement target 100. Step S10 is performed after Step S9. If the determination in Step S10 is negative (NO in Step S10), the process goes to Step S3. After Step S7, the process goes back to Step S21. After Step S5, the process goes to Step S22.

In Step S22, the scan angle range and amount of shift calculation module 53 in the arithmetic circuit 5-1 sets in the sensor driving control circuit 21 the mirror driving condition for supplying the driving control signal used to drive the scanning mirror 24 with two axes to the mirror controller 25. Specifically, the scan angle range and amount of shift calculation module 53 supplies the setting values of the calculated scan angle range and the amount of shift of the scan angle range to the sensor driving control circuit 21. When the scan angle range is reset in Step S5, the scan angle range and amount of shift calculation module 53 sets the mirror driving condition based on the reset scan angle range in Step S22. After Step S22, the process goes back to Step S20.

According to the third embodiment, in addition to the advantages in the first embodiment, it is possible to also support the case in which the measurement target does not appear in the scan angle range by continuously estimating the range of the measurement target from the past results of measurement.

Fourth Embodiment

A distance measurement apparatus according to a fourth embodiment has the same configuration as that of the distance measurement apparatus according to the first embodiment described above with reference to FIG. 1 to FIG. 3. In the fourth embodiment, if the sampling density is higher than a threshold value exceeding a desired sampling density even when the distance to the measurement target 100 is decreased and the scan angle range is the maximum scan angle range (that is, the maximum operation angle range of the scanning mirror 24), the light emission timing (light emission interval) of the laser diode 23 is changed to perform the measurement in the maximum scan angle range. Specifically, if the sampling density is higher than a threshold value exceeding a desired sampling density even when the scan angle range is the maximum scan angle range, the light emission timing of the laser diode 23 is adjusted so that the sampling density is decreased and the measurement is performed in the maximum scan angle range to keep the desired sampling density.

Figure 7:
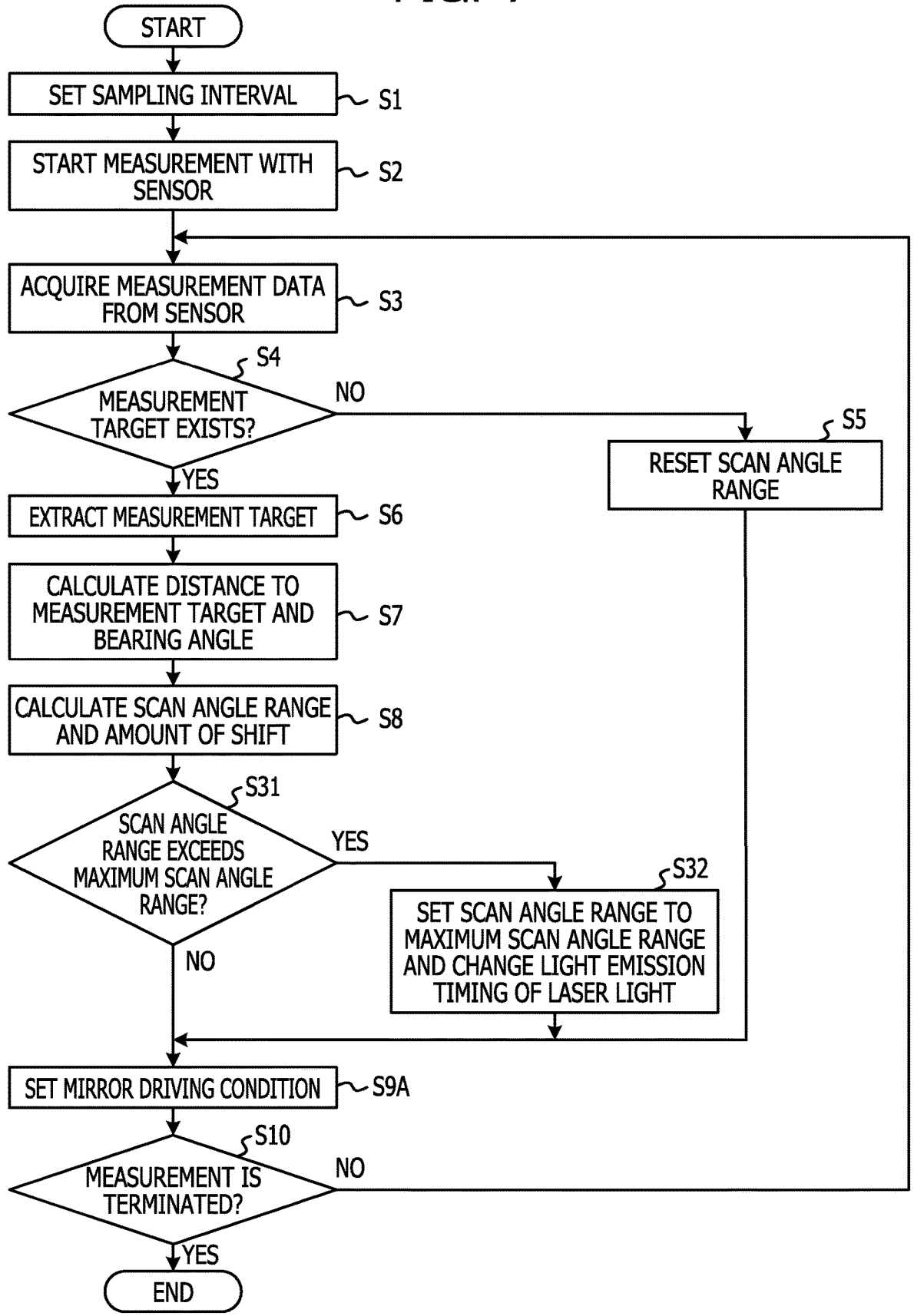
FIG. 7 is a flowchart illustrating an example of a distance measurement process in a fourth embodiment.

FIG. 7 is a flowchart illustrating an example of a distance measurement process in the fourth embodiment. The same step numbers are used in FIG. 7 to identify the same steps as in FIG. 4 and a description of such steps is omitted herein. Referring to FIG. 7, after Step S8, the process goes to Step S31. In Step S31, the scan angle range and amount of shift calculation module 53 in the arithmetic circuit 5-1 determines whether the scan angle range calculated in Step S8 exceeds the maximum scan angle range (that is, the maximum operation angle range of the scanning mirror 24). If the determination is affirmative (YES in Step S31), the process goes to Step S32. If the determination is negative (NO in Step S31), the process goes to Step S9A. In Step S32, the scan angle range and amount of shift calculation module 53 sets the scan angle range to the maximum scan angle range and changes the light emission timing of the laser diode 23 so that the sampling density in the maximum scan angle range is equal to a desired sampling density (that is, adjusts the light emission timing so that the sampling density is decreased). After Step S32, the process goes to Step S9A. In Step S9A, the scan angle range and amount of shift calculation module 53 in the arithmetic circuit 5-1 sets in the sensor driving control circuit 21 the mirror driving condition for supplying the driving control signal used to drive the scanning mirror 24 with two axes to the mirror controller 25. In addition, in Step S9A, the scan angle range and amount of shift calculation module 53 in the arithmetic circuit 5-1 sets in the sensor driving control circuit 21 a laser driving condition for supplying the light emission timing signal used to cause the laser diode 23 to emit light at the adjusted light emission timing to the laser driving circuit 22. Specifically, the scan angle range and amount of shift calculation module 53 supplies the setting values of the set scan angle range (in this case, the maximum scan angle range) and the amount of shift of the scan angle range and a setting value of the light emission timing to the sensor driving control circuit 21.

According to the fourth embodiment, in addition to the advantages in the first embodiment, it is possible to keep a desired sampling density by adjusting the light emission timing even if the sampling density is higher than the desired sampling density in the maximum scan angle range.

Fifth Embodiment

A distance measurement apparatus according to a fifth embodiment has the same configuration as that of the distance measurement apparatus according to the first embodiment described above with reference to FIG. 1 to FIG. 3.

Figure 8:
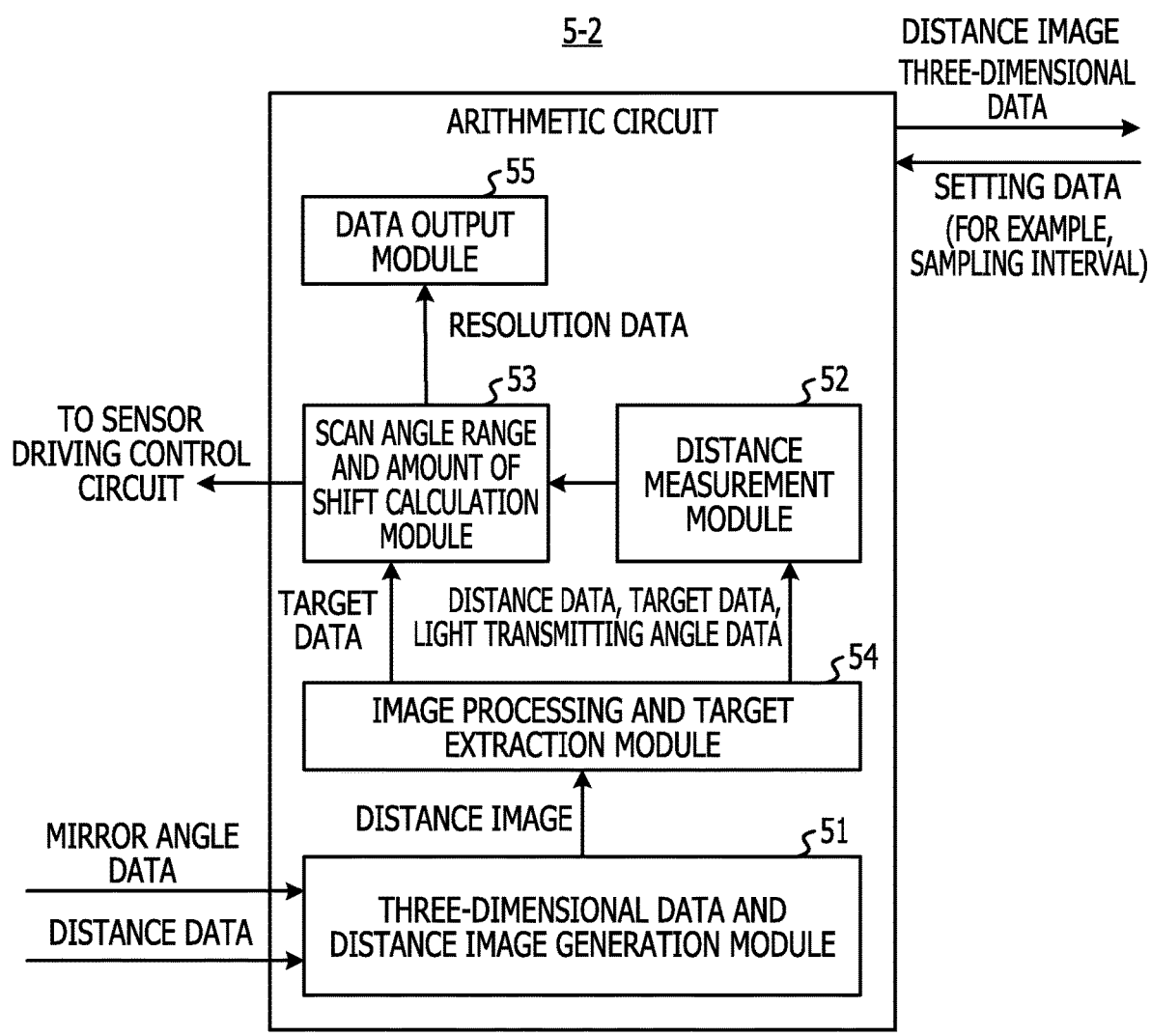
FIG. 8 is a functional block diagram illustrating an example of an arithmetic circuit in a fifth embodiment.

FIG. 8 is a functional block diagram illustrating an example of an arithmetic circuit in the fifth embodiment. The same reference numerals are used in FIG. 8 to identify the same components as in FIG. 2 and a description of such components is omitted herein. In the fifth embodiment, an arithmetic circuit 5-2 illustrated in FIG. 8 is used, instead of the arithmetic circuit 5-1, in FIG. 1. The arithmetic circuit 5-2 illustrated in FIG. 8 includes a data output module 55. In the fifth embodiment, if the sampling density is higher than a threshold value exceeding a desired sampling density even when the distance to the measurement target 100 is decreased and the scan angle range is the maximum scan angle range (that is, the maximum operation angle range of the scanning mirror 24), the measurement is performed in the maximum scan angle range, the result of measurement is decimated in the data output module 55 by an amount corresponding to the increased resolution, and supplies the result of measurement subjected to the decimation to the computer 4. The amount corresponding to the increased resolution is determined from, for example, resolution data supplied from the scan angle range and amount of shift calculation module 53. Specifically, the three-dimensional data is decimated by the amount corresponding to the increased resolution and the decimated three-dimensional data is supplied to the computer 4. The arithmetic circuit 5-2 is an example of the changing unit that changes the measurement range so that the sampling density has a certain value or higher based on the measured distance to the measurement target and the detected bearing of the measurement target.

Figure 9:
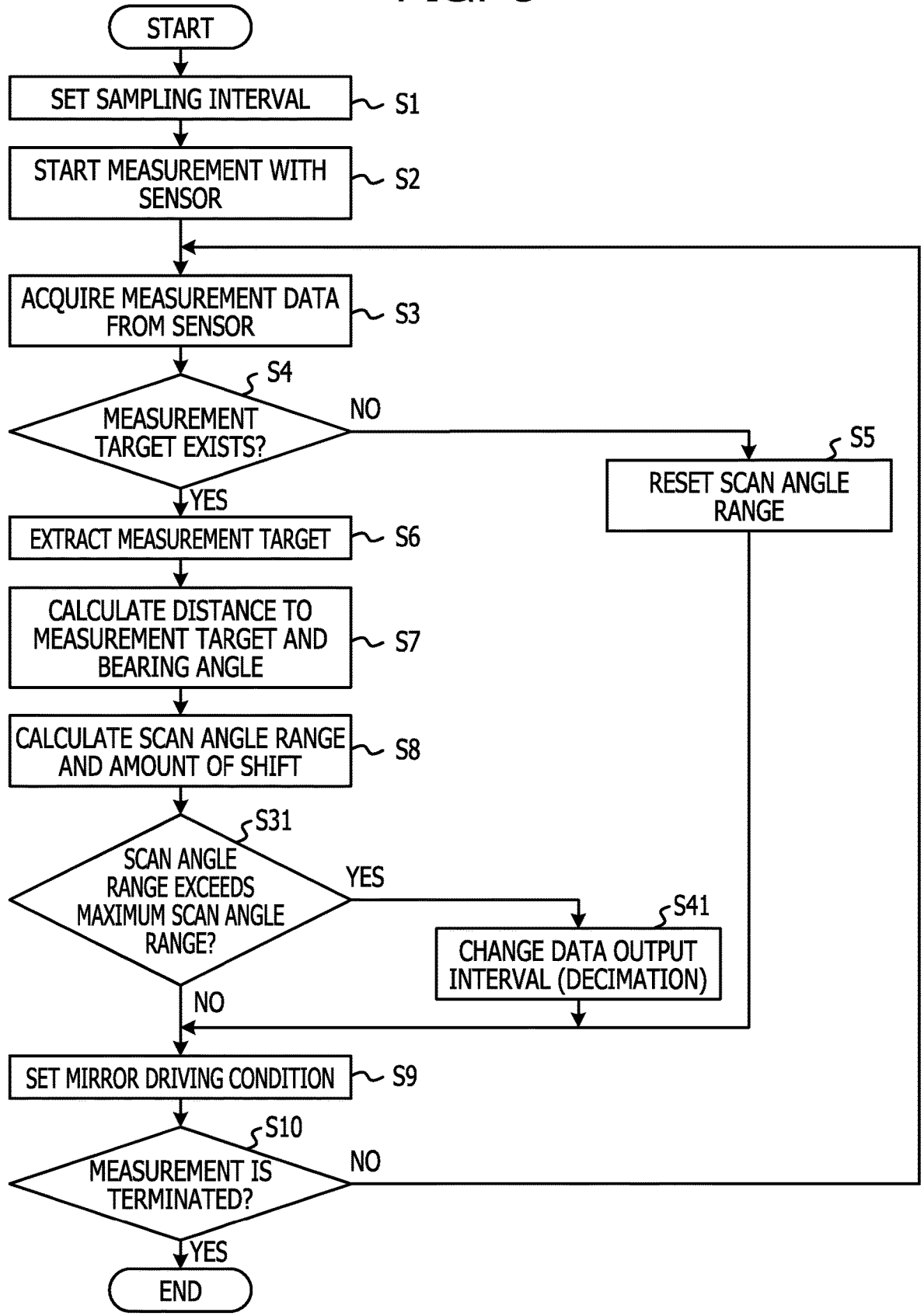
FIG. 9 is a flowchart illustrating an example of a distance measurement process in the fifth embodiment.

FIG. 9 is a flowchart illustrating an example of a distance measurement process in the fifth embodiment. The same step numbers are used in FIG. 9 to identify the same steps as in FIG. 4 and a description of such steps is omitted herein. Referring to FIG. 9, if the determination in Step S31 is affirmative (YES in Step S31), the process goes to Step S41. If the determination in Step S31 is negative (NO in Step S31), the process goes to Step S42. In Step S41, the data output module 55 in the arithmetic circuit 5-2 changes (decreases) data output interval based on the resolution data to decimate the three-dimensional data by an amount corresponding to the increased resolution. Then, the process goes to Step S9. In Step S42, the data output module 55 in the arithmetic circuit 5-2 supplies the three-dimensional data to the computer 4. In this case, the three-dimensional data to be supplied to the computer 4 is subjected to the decimation in the data output module 55 only when the process goes from Step S41 to Step S42.

According to the fifth embodiment, in addition to the advantages in the first embodiment, it is possible to keep a desired sampling density in the output result of measurement by decimating output data (for example, the three-dimensional data) by the amount corresponding to the increased resolution even if the sampling density is higher than the desired sampling density in the maximum scan angle range.

Sixth Embodiment

Figure 10:
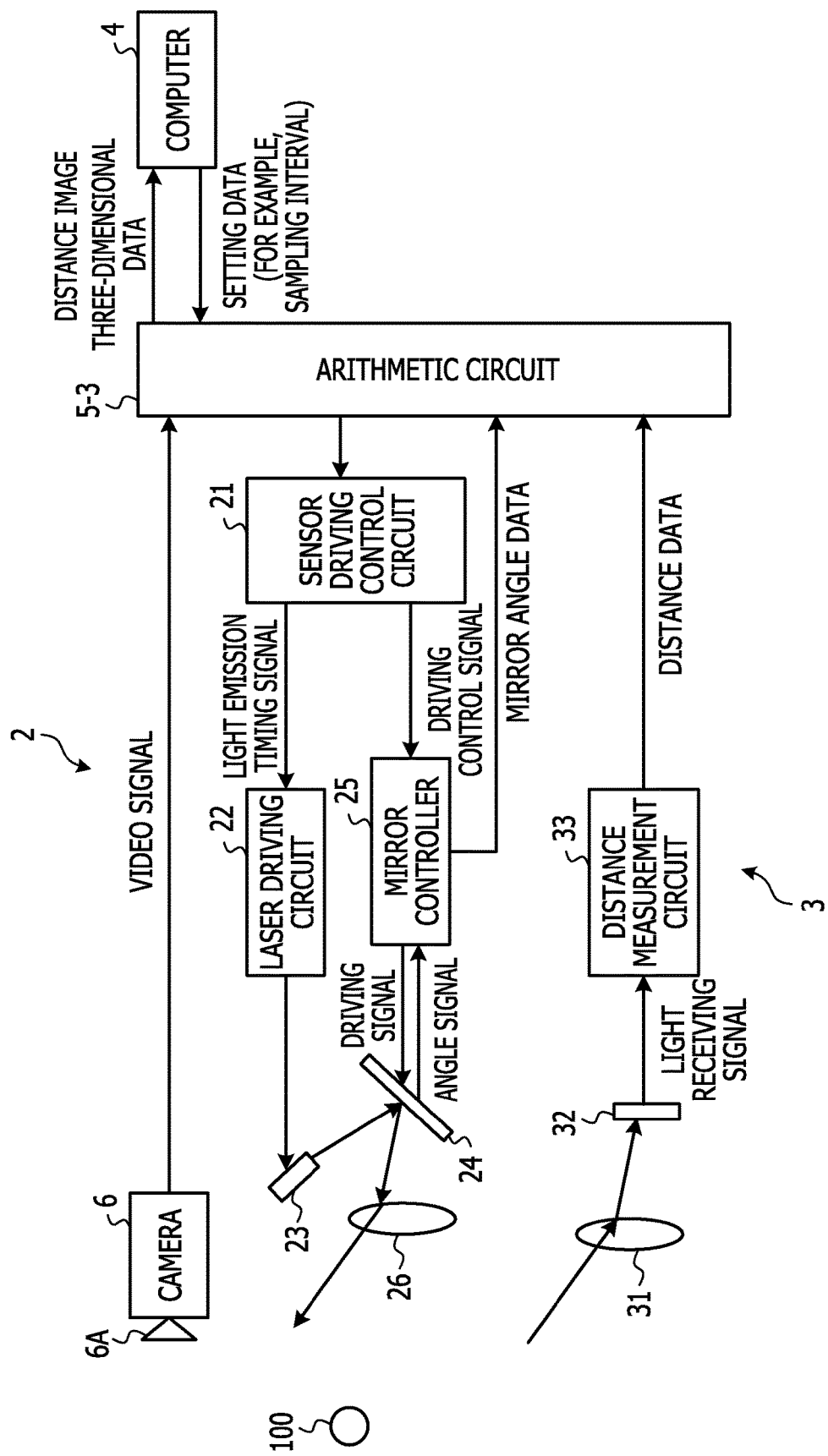
FIG. 10 illustrates an exemplary distance measurement apparatus according to a sixth embodiment.

FIG. 10 illustrates an exemplary distance measurement apparatus according to a sixth embodiment. The same reference numerals are used in FIG. 10 to identify the same components as in FIG. 1 and a description of such components is omitted herein. Referring to FIG. 10, a sensor main body 1-2 includes a camera 6. The camera 6 is an example of an imaging unit that captures an image in an angle of view wider than the scan angle range. The camera 6 has a known configuration including a camera lens 6A, an imaging device (not illustrated), and so on and desirably has an angle of view wider than the maximum scan angle range of the sensor main body 1-2. Making the angle of view of the camera 6 wider than the maximum scan angle range of the sensor main body 1-2 increases the possibility that the measurement target 100 is capable of being extracted even when the measurement target 100 is shifted to the outside of the scan angle range of the sensor main body 1-2. A video signal representing a video captured by the camera 6 is supplied to an arithmetic circuit 5-3 in units of frames. In the sixth embodiment, the measurement target 100 is extracted based on the video signal supplied from the camera 6.

Figure 11:
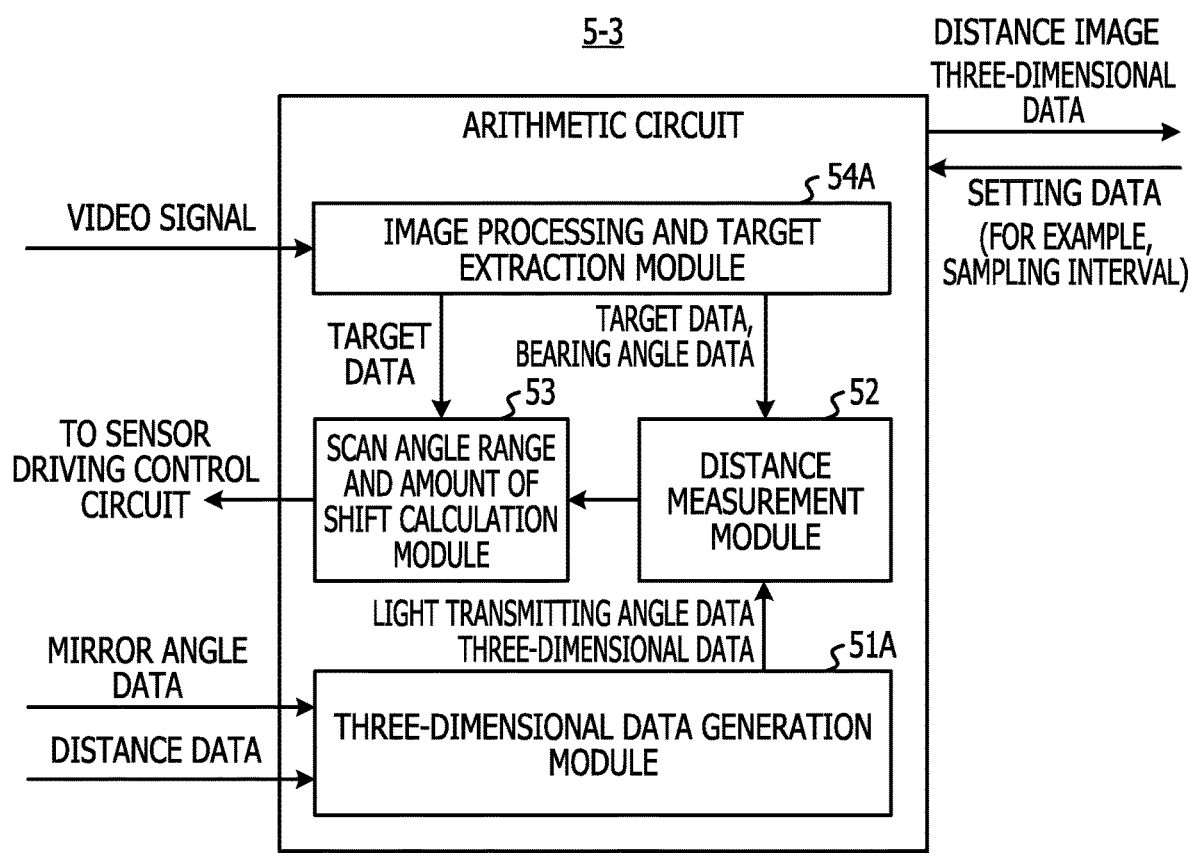
FIG. 11 is a functional block diagram illustrating an example of an arithmetic circuit illustrated in FIG. 10.

FIG. 11 is a functional block diagram illustrating an example of the arithmetic circuit illustrated in FIG. 10. The same reference numerals are used in FIG. 11 to identify the same components as in FIG. 2 and a description of such components is omitted herein. The arithmetic circuit 5-3 illustrated in FIG. 11 uses a three-dimensional data generation module 51A, instead of the three-dimensional data and distance image generation module 51 illustrated in FIG. 2. The three-dimensional data generation module 51A is an example of a three-dimensional data generating unit that calculates the light transmitting angle data about the laser light from the mirror angle data and generates the three-dimensional data from the distance image generated from the distance data and the mirror angle data. The three-dimensional data generation module 51A supplies the light transmitting angle data and the three-dimensional data to the distance measurement module 52. The arithmetic circuit 5-3 illustrated in FIG. 11 uses an image processing and target extraction module 54A, instead of the image processing and target extraction module 54 illustrated in FIG. 2. The image processing and target extraction module 54A extracts the measurement target 100 from the video signal using a known method if the measurement target 100 exists in the video captured by the camera 6. In the video signal, angle information exists for each pixel from the relationship between the camera lens 6A and the imaging device. The angle information for each pixel may be associated with the scanning direction of the laser light. Accordingly, the image processing and target extraction module 54A is capable of calculating, for example, the bearing angle of the centroid of the extracted measurement target 100 and outputting bearing angle data indicating the bearing angle. Video data for each frame of the video signal may be supplied to the computer 4.

In the sixth embodiment, the image processing and target extraction module 54A is an example of the target extracting unit that extracts the measurement target 100 from the distance image when the measurement target 100 exists in one frame of the video signal. The method of extracting the measurement target 100 from one frame of the video signal is not specifically limited and, for example, when the measurement target 100 is a human being, the measurement target 100 may be extracted by detecting a form, such as a posture, of the human being from the distance image. Accordingly, the image processing and target extraction module 54A supplies the bearing angle data and the target data to the distance measurement module 52 and supplies the target data to the scan angle range and amount of shift calculation module 53.

The distance measurement module 52 calculates the distance to the centroid position of the measurement target 100 and the bearing angle to the centroid position of the measurement target 100 from the light transmitting angle data, the target data, and the bearing angle data. The distance measurement module 52 causes the center of an image capturing range of the camera 6 to coincide with the center of the measurement range of the sensor main body 1-2 to convert the bearing angle data viewed from the camera 6 into the bearing angle data viewed from the sensor main body 1-2. The distance measurement module 52 is an example of the distance and bearing calculating unit that calculates the distance and the bearing angle to the centroid position of the measurement target 100. The method of calculating the centroid of the measurement target 100 is not specifically limited and may be calculated using, for example, a known method. The method of calculating the bearing angle to the measurement target 100 is not specifically limited and may be calculated using, for example, a known method.

The scan angle range and amount of shift calculation module 53 calculates the setting values of the scan angle range and the amount of shift of the scan angle range so that a desired sampling interval (that is, a desired sampling density) supplied from the computer 4 in advance is achieved and the measurement target 100 is detected near the center of the scan angle range, based on the distance and the bearing angle to the centroid position of the measurement target 100. The scan angle range and amount of shift calculation module 53 supplies the setting values to the sensor driving control circuit 21 and goes to the next measurement. Shifting the scan angle range enables the center of the scan angle range to be shifted to change the area covered with the scan angle range.

Figure 12:
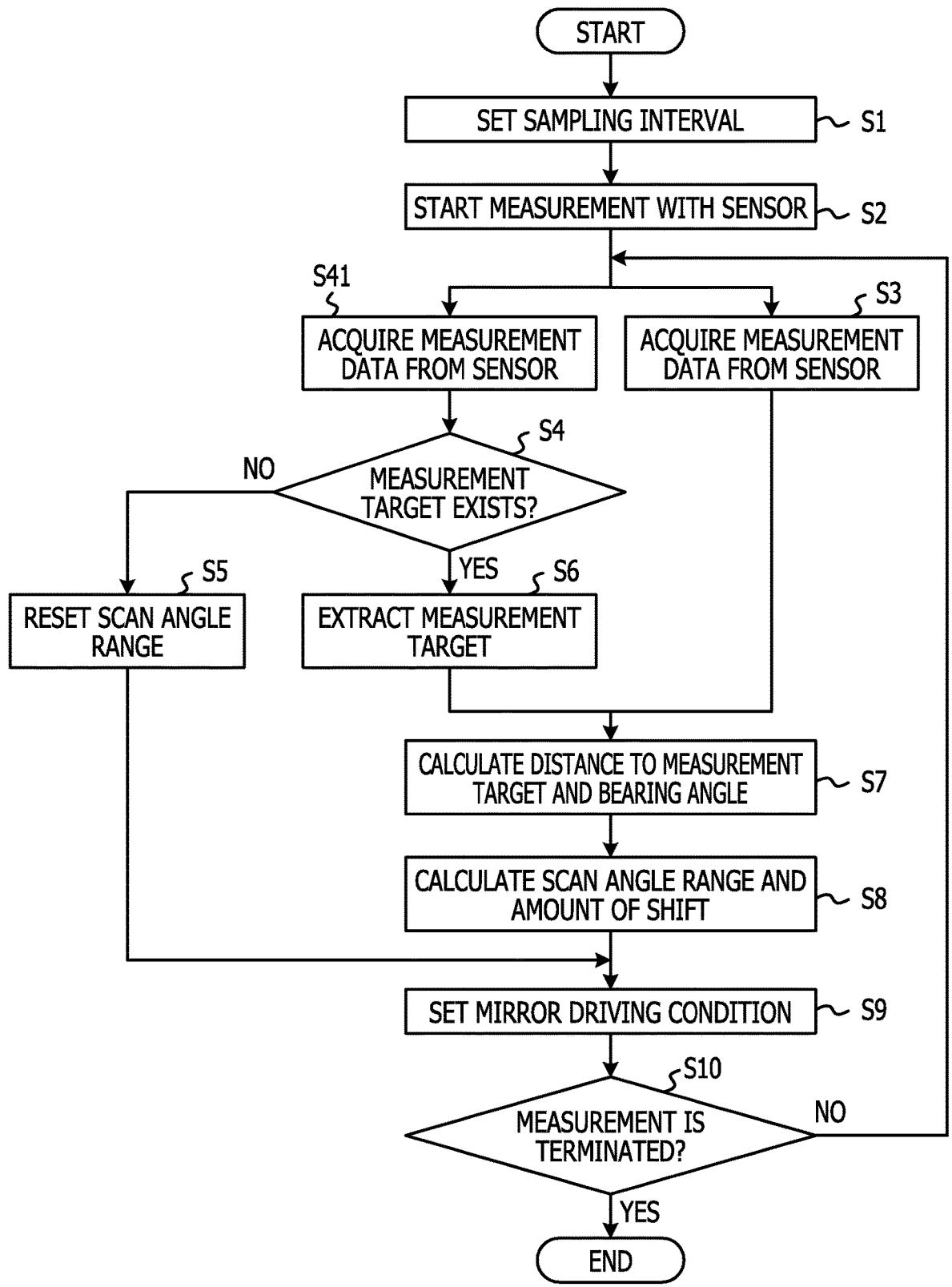
FIG. 12 is a flowchart illustrating an example of a distance measurement process in the sixth embodiment.

FIG. 12 is a flowchart illustrating an example of a distance measurement process in the sixth embodiment. The same step numbers are used in FIG. 12 to identify the same steps as in FIG. 4 and a description of such steps is omitted herein. Referring to FIG. 12, after Step S2, Step S3 and Step S41 may be concurrently performed. Step S3 is performed by the three-dimensional data generation module 51A, instead of the three-dimensional data and distance image generation module 51. After Step S3, the process goes to Step S7. In Step S41, the image processing and target extraction module 54A in the arithmetic circuit 5-3 acquires the video signal from the camera 6. After Step S41, the process goes to Step S4. Accordingly, in Step S4, the image processing and target extraction module 54A in the arithmetic circuit 5-3 determines whether the measurement target 100 exists in the video represented by the acquired video signal. If the determination is negative (NO in Step S4), the process goes to Step S5. If the determination is affirmative (YES in Step S4), the process goes to Step S6.

The method of extracting the measurement target 100 based on the video signal supplied from the camera 6, as in the sixth embodiment, is applicable to the second to fifth embodiments described above. Accordingly, combination of the extraction of the measurement target 100 using the camera 6 in the sixth embodiment with any of the configurations of the second to fifth embodiments described above achieves the same advantages of the second to fifth embodiments described above.

Figure 13:
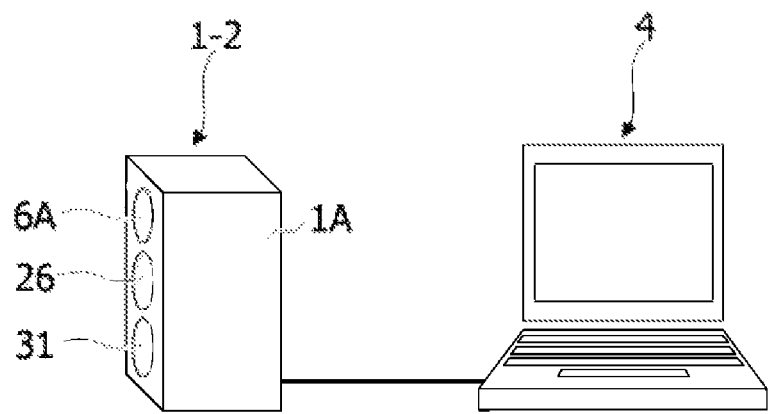
FIG. 13 illustrates an exemplary housing of a sensor main body.

FIG. 13 illustrates an exemplary housing of the sensor main body 1-1. An example is illustrated in FIG. 13 for convenience, in which the sensor main body 1-2 of the distance measurement apparatus is connected to the computer 4, which is composed of a personal computer (PC). The sensor main body 1-2 includes a housing 1A. The light transmitting unit 2, the light receiving unit 3, the arithmetic circuit 5-3, and the camera 6 are housed in the housing 1A. In the example in FIG. 13, the camera lens 6A, the light transmitting lens 26 in the light transmitting unit 2, and the light receiving lens 31 in the light receiving unit 3 are arranged on one side face of the housing 1A.

Since the camera 6 is not provided in the sensor main body 1-1 in the case of the distance measurement apparatus illustrated in FIG. 1, the light transmitting unit 2, the light receiving unit 3, and the arithmetic circuit 5-3 are housed in a housing (not illustrated) corresponding to the housing 1A. Accordingly, the light transmitting lens 26 in the light transmitting unit 2 and the light receiving lens 31 in the light receiving unit 3 are arranged on one side face of the housing of the sensor main body 1-1.

Figure 14:
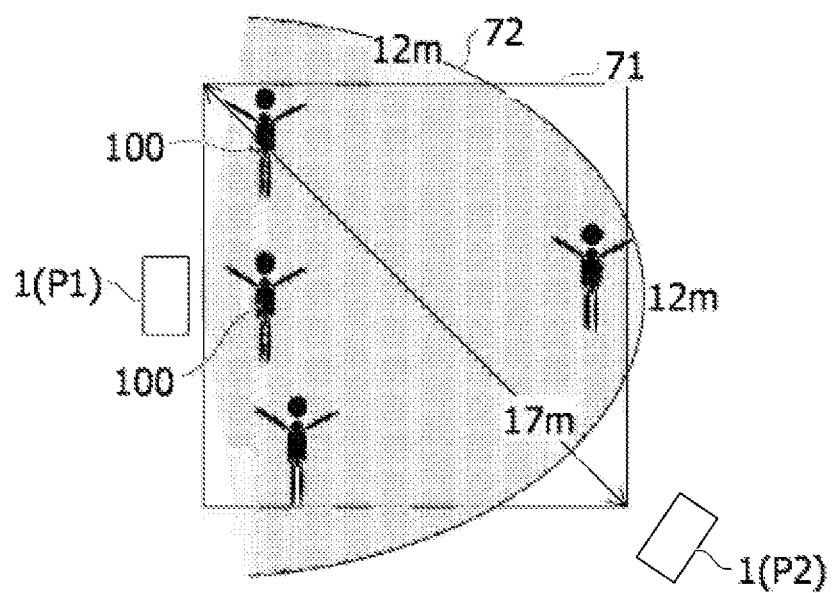
FIG. 14 is a schematic view for describing a floor where a performance of a floor exercise is given and a scan angle range.
Figure 15:
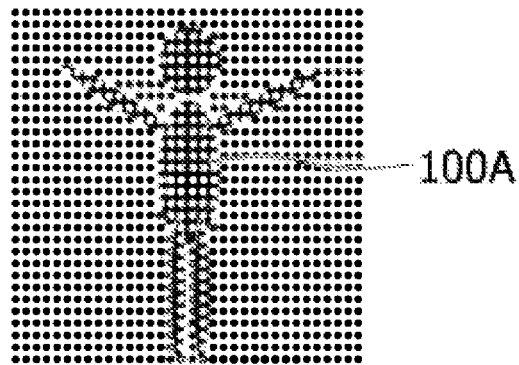
FIG. 15 is a schematic view for describing a measurement target 2.3 m from the distance measurement apparatus and sampling density.
Figure 16:
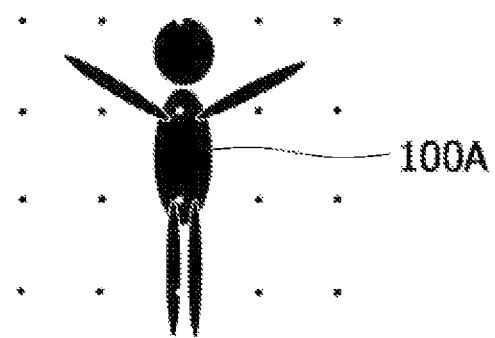
FIG. 16 is a schematic view for describing a measurement target 17 m from the distance measurement apparatus and the sampling density.

An exemplary distance measurement process will now be described with reference to FIG. 14 to FIG. 16. FIG. 14 is a schematic view for describing a floor where a performance of a floor exercise in gymnastics is given and the scan angle range. FIG. 15 is a schematic view for describing a measurement target 2.3 m from the distance measurement apparatus and the sampling density. FIG. 16 is a schematic view for describing a measurement target 17 m from the distance measurement apparatus and the sampling density. Referring to FIG. 15 and FIG. 16, dots represent the sampling points (or the focusing points).

In the example illustrated in FIG. 14 to FIG. 16, a case is described in which the measurement target 100 is a gymnast and the form of a performance of a floor exercise by the gymnast is measured. The area of a floor 71 where a performance of a floor exercise is given is 12 m×12 m and the maximum distance in a diagonal direction is about 17 m, as illustrated in FIG. 14. In this case, a scan angle interval (or a sampling angle interval) to set the interval between the sampling points (that is, the sampling density) at a point 17 m from the sensor main body 1 (P2) at a position P2 to, for example, 2 cm is 0.067 degrees. For example, when the frequency of one scanning is 30 Hz and a range of 160 degrees×120 degrees is horizontally and vertically measured at the sampling points (or the focusing points) of 320×240, the light emission frequency of the laser source is about 2.4 MHz. The scan angle interval in this case is 0.5 degrees. Referring to FIG. 14, a shaded area 72 corresponds to the scan angle range of the sensor main body 1 (P1) at a position P1.

However, the distance from, for example, the sensor main body 1 (P1) at the position P1 to the measurement target 100 when the measurement is performed at a light emission frequency of about 2.4 MHz and at a sampling density of 2 cm, as illustrated in FIG. 15, is 2.3 m. When the light emission frequency is about 2.4 MHz and the distance from, for example, the sensor main body 1 (P2) at the position P2 to the measurement target 100 is 17 m, the sampling density is about 15 cm, as illustrated in FIG. 16. Referring to FIG. 15 and FIG. 16, reference numeral 100A denotes an image of the measurement target 100 detected in the scan angle range. In order to set the scan angle interval in this case to 0.067 degrees, the desirable light emission frequency is 0.5 degrees/0.067 degrees×2.4 MHz=about 17.2 MHz. Since large current of 10 A or more is instantaneously used for one laser pulse, the amount of heat generation is increased with the increasing light emission frequency.

Setting the sampling density to a high value when the measurement target is remote from the sensor main body 1 in order to perform the measurement with high resolution makes the measurement difficult due to the heat generation caused by the increase in power consumption.

The size of the measurement range and the sampling density are varied with the distance from the sensor main body to the measurement target. Accordingly, for example, when the measurement target is close to the distance measurement apparatus, the measurement range is narrowed, compared with the case in which the measurement target is remote from the distance measurement apparatus, and the measurement target may possibly be moved to the outside of the measurement range. Setting the sampling density to a high value when the measurement target is remote from the distance measurement apparatus makes the measurement difficult due to the heat generation caused by the increase in power consumption, as described above.

In other words, since the measurement precision depends on the distance to the measurement target, it is difficult to stably perform the measurement with high precision. In addition, in the case in which the measurement precision is varied with the distance to the measurement target, it is difficult to accurately analyze the motion of the measurement target and track the motion of the measurement target based on the result of the measurement by the distance measurement apparatus.

Accordingly, the request to stably perform measurement with high precision by widening the measurement range and the request to perform measurement with high resolution by increasing the sampling density in the measurement range are made. The inventors have found that it is desirable to meet both of the requests especially when the motion of the measurement target is analyzed or the motion of the measurement target is tracked.

The sampling density in the measurement range is kept at a certain value, regardless of the distance to the measurement target, to meet both of the requests in the above embodiments.

Figures 17A, 17B, 17C:
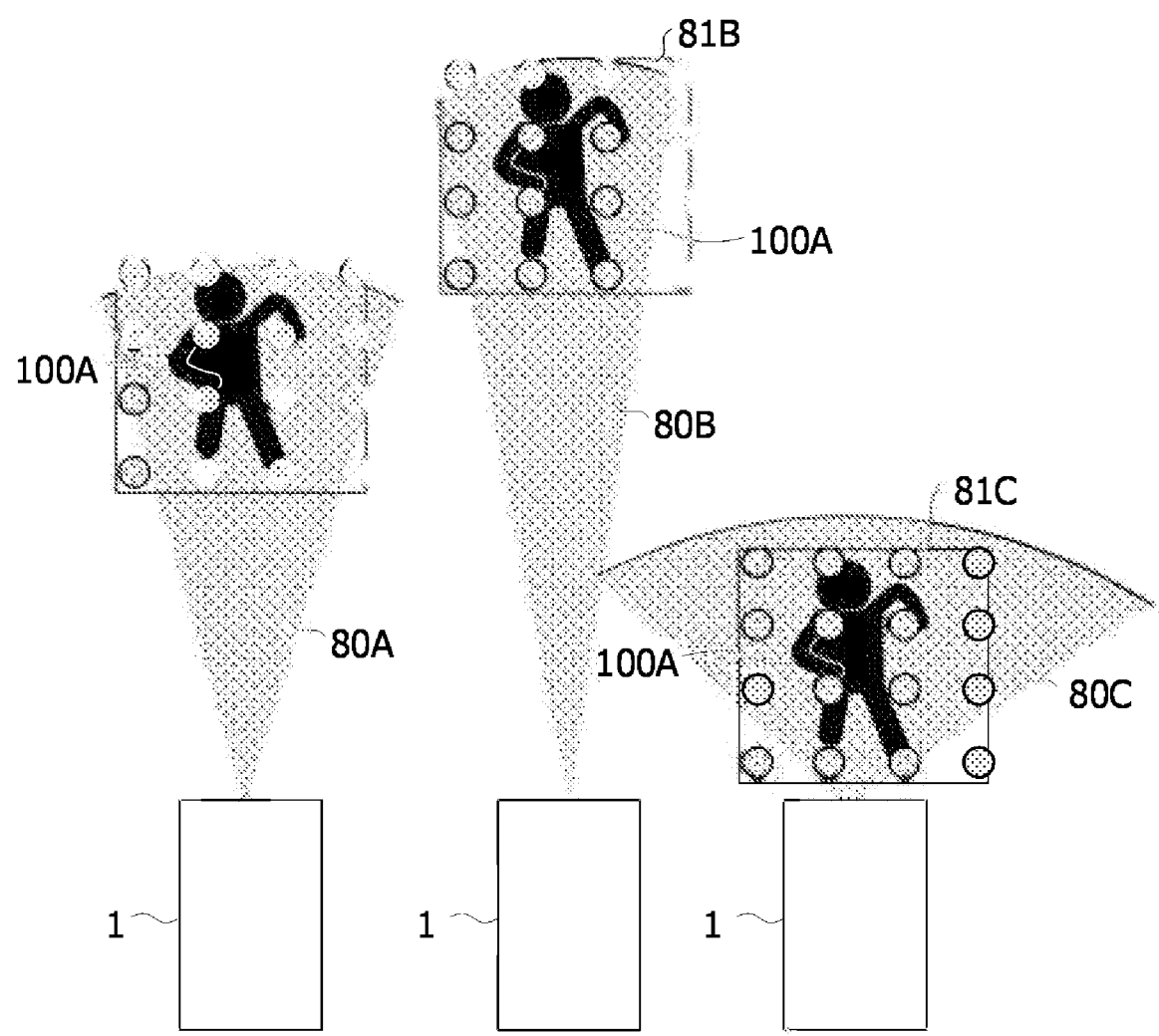
FIG. 17A to FIG. 17C are schematic views for describing a measurement range of a measurement target and the scan angle range at different distances.

FIG. 17A to FIG. 17C are schematic views for describing the measurement range of the measurement target and the scan angle range at different distances. FIG. 17A illustrates the image 100A of the measurement target 100 detected with a certain sampling density Sd in a measurement range 81A by scanning the measurement target 100 at a first distance d1 from the sensor main body 1 in a first scan angle range Ar1. FIG. 17B illustrates the image 100A of the measurement target 100 detected with the certain sampling density Sd in a measurement range 81B by scanning the measurement target 100 at a second distance d2 (d2>d1) from the sensor main body 1 in a second scan angle range Art (<Ar1). FIG. 17C illustrates the image 100A of the measurement target 100 detected with the certain sampling density Sd in a measurement range 81C by scanning the measurement target 100 at a third distance d3 (<d1) from the sensor main body 1 in a third scan angle range Ar3 (>Ar1).

Figure 18:
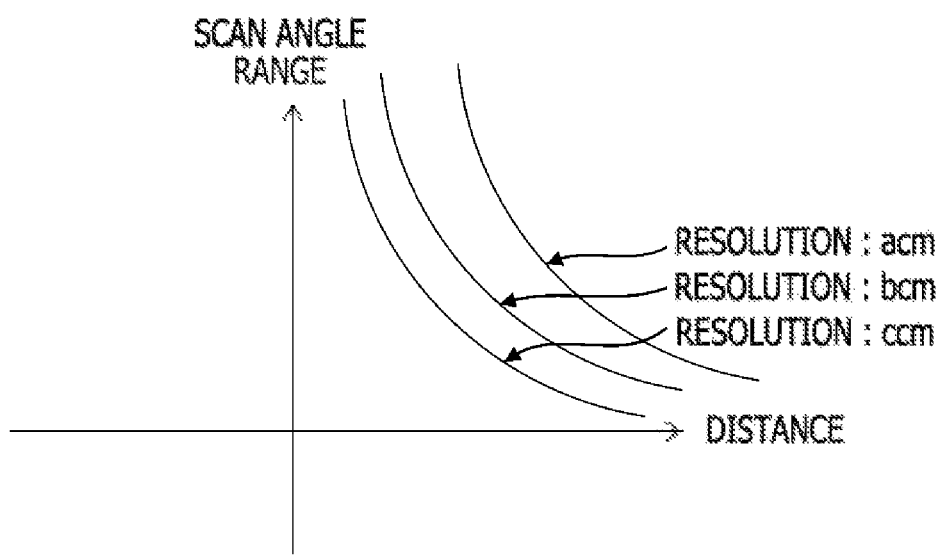
FIG. 18 is a graph illustrating the relationship between the scan angle range and a distance to keep resolution at a certain value.

FIG. 18 is a graph illustrating the relationship between the scan angle range and the distance to keep the resolution at a certain value. Referring to FIG. 18, the vertical axis represents the scan angle range in an arbitrary unit and the horizontal axis represents the distance to the measurement target 100 in an arbitrary unit. Referring to FIG. 18, bcm indicates the relationship between the scan angle range and the distance to keep the resolution at a certain value in the measurement range 81A by scanning the measurement target 100 the first distance d1 from the sensor main body 1 in the first scan angle range Ar1, for example, as illustrated in FIG. 17A, ccm indicates the relationship between the scan angle range and the distance to keep the resolution at a certain value in the measurement range 81B by scanning the measurement target 100 the second distance d2 (>d1) from the sensor main body 1 in the second scan angle range Art (<Ar1), for example, as illustrated in FIG. 17B, and acm indicates the relationship between the scan angle range and the distance to keep the resolution at a certain value in the measurement range 81C by scanning the measurement target 100 the third distance d3 (<d1) from the sensor main body 1 in the third scan angle range Ar3 (>Ar1), for example, as illustrated in FIG. 17C.

In the above embodiments, the sampling densities in the measurement ranges 81A, 81B, and 81C are equal to the sampling density Sd, which are kept at a certain value or higher, regardless of the distance to the measurement target 100, as illustrated in FIG. 17A to FIG. 17C. Accordingly, it is possible to keep the resolutions in the measurement ranges 81A, 81B, and 81C at a certain value or higher regardless of the distance to the measurement target 100, as illustrated in FIG. 18.

In the sixth embodiment described above, the angle of view of the camera 6 is set to a value wider than the maximum scan angle range of the sensor main body 1-2, as described above. Accordingly, the center of a video captured by the camera 6 desirably coincides with the center of the measurement range scanned by the sensor main body 1-2.

Figure 19:
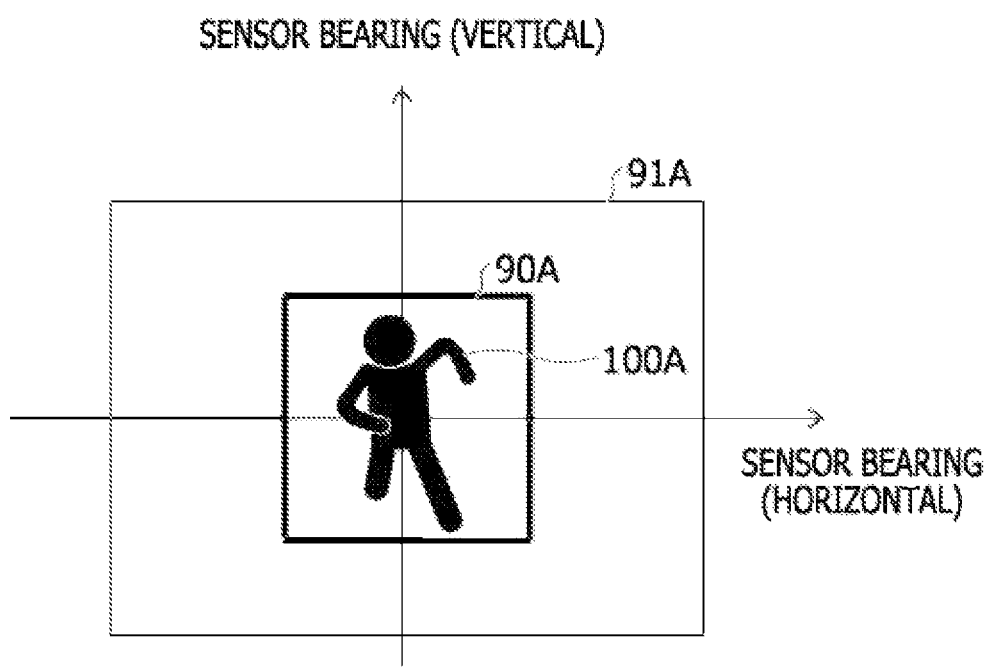
FIG. 19 is an exemplary diagram for describing a case in which the center of a video captured by a camera coincides with the center of the measurement range of the sensor main body.
Figure 20:
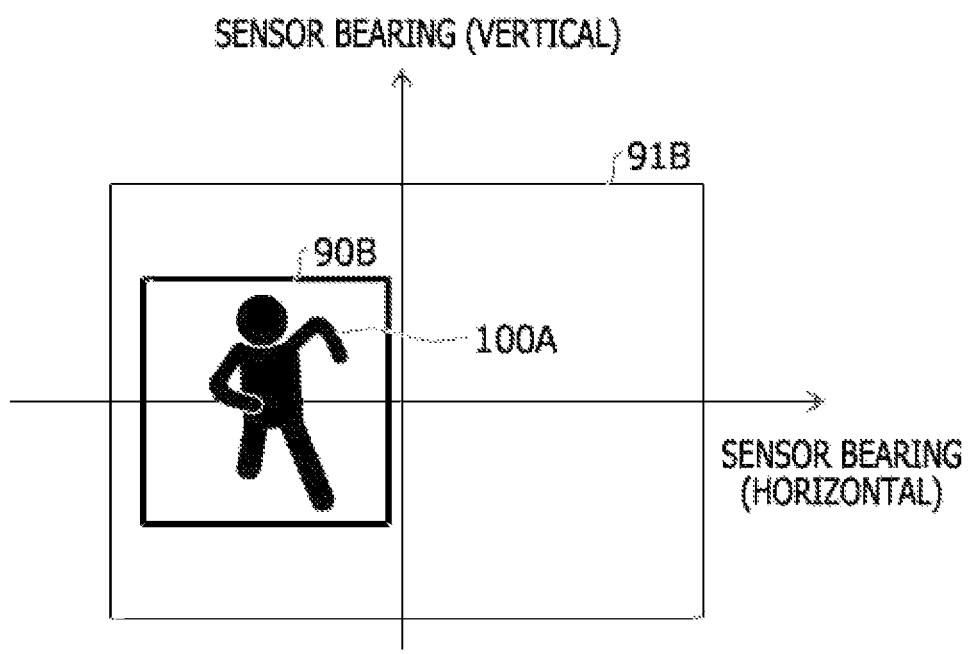
FIG. 20 is an exemplary diagram for describing a case in which the center of a video captured by the camera is shifted from the center of the measurement range of the sensor main body.

FIG. 19 is an exemplary diagram for describing a case in which the center of a video captured by the camera coincides with the center of the measurement range of the sensor main body. Referring to FIG. 19 and FIG. 20 described below, a sensor bearing (vertical) indicates the direction vertical to the ground viewed from, for example, the sensor main body 1 disposed in parallel to the ground and a sensor bearing (horizontal) indicates the direction parallel to the ground viewed from the sensor main body 1. In the example illustrated in FIG. 19, the center of a video 91A captured by the camera 6 coincides with the center of a measurement range 90A scanned by the sensor main body 1-2. In addition, in the video 91A captured by the camera 6, the image 100A of the measurement target 100 is included in a central portion of the video 91A. Furthermore, the measurement target 100 is detected in a central portion of the measurement range 90A scanned by the sensor main body 1-2.

FIG. 20 is an exemplary diagram for describing a case in which the center of a video captured by the camera is shifted from the center of the measurement range of the sensor main body. In the example in FIG. 20, in a video 91B captured by the camera 6, the image 100A of the measurement target 100 is shifted from the center of the video 91B leftward in FIG. 20, although the image 100A of the measurement target 100 is included in the video 91B. The scan angle range of the sensor main body 1-2 has been shifted so that the measurement target 100 is capable of being detected and the measurement target 100 is detected in a central portion of a measurement range 90B scanned by the sensor main body 1-2.

According to the above embodiments, the distance to the measurement target is capable of being measured at a certain sampling density or higher in the measurement range even when the distance to the measurement target is changed. In other words, it is possible to keep the resolution in the measurement range to a certain value or higher regardless of the distance to the measurement target. Accordingly, according to the above embodiments, it is possible to meet both the request to stably perform measurement with high precision by widening the measurement range and the request to perform measurement with high resolution by increasing the sampling density in the measurement range. In addition, according to the above embodiments, it is possible to accurately analyze the form or motion of an athlete in the above manner based on, for example, the form measured by the distance measurement apparatus, regardless of the distance to the measurement target. Furthermore, since the scan angle range is capable of being shifted so that the measurement target 100 is detected near the center of the scan angle range, it is possible to track the motion of the measurement target 100.

While the distance measurement apparatus, the distance measurement method, and the program according to the present disclosure are described in terms of some specific examples and embodiments, it will be clear that the present disclosure is not limited to these specific examples and embodiments and that many changes and modified embodiments will be obvious to those skilled in the art without departing from the true spirit and scope of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for distance measurement, the apparatus comprising:
 a memory; and
 a processor coupled to the memory and configured to
  execute a detection process that includes detecting a measurement target from among a distance image obtained by two-dimensional scanning of a scan angle range with laser light, the detected measurement target being a moving object,
  execute a calculating process that includes obtaining a distance between the apparatus and a position of the detected measurement target, obtaining a bearing angle from the apparatus to the detected measurement target, and calculating a scan angle range and a shift value of the scan angle range in accordance with the obtained distance and the obtained bearing angle, the calculating of the scan angle range being configured to calculate the scan angle range such that sampling density within the scan angle range is equal or higher than a certain value, the calculating of the shift value being configured to calculate the shift value such that the detected measurement object is included in a center of the calculated scan angle range, and execute a changing process that includes updating an operation parameter in the two-dimensional scanning by using the calculated scan angle range and the calculated shift value, thereby the distance image obtained by the two-dimensional scanning based on the updated operation parameter includes the measurement target even if a position of the measurement target has been changed.

2. The apparatus according to claim 1,
wherein the changing process includes shifting a center of the scan angle range with the laser light based on the bearing angle or an estimated position of the measurement target.

3. The apparatus according to claim 1,
wherein the changing process includes, when the sampling density is lower than the sampling density having a certain value or higher in a maximum scan angle range with the laser light, setting the scan angle range to the maximum scan angle range.

4. The apparatus according to claim 3,
wherein the changing process includes, when the scan angle range is the maximum scan angle range and the sampling density exceeds a threshold value, controlling light emission timing of the laser light so that the sampling density is lower than or equal to the threshold value.

5. The apparatus according to claim 3,
wherein the changing process includes, when the scan angle range is the maximum scan angle range and the sampling density exceeds a threshold value, decimating a result of measurement so that the sampling density is lower than or equal to the threshold value.

6. The apparatus according to claim 1,
wherein the changing process includes calculating the bearing angle based on distance data measured through the scanning with the laser light and mirror angle data for a scanning mirror that deflects the laser light.

7. The apparatus according to claim 1,
wherein the processor is configured to execute an imaging process, the imaging process including acquiring an image captured by a camera having an angle of view wider than the scan angle range, and wherein the changing process includes calculating the bearing angle based on distance data measured through the scanning with the laser light and the image captured by the camera having the angle of view wider than the scan angle range.

8. A method for distance measurement, the method comprising:

executing, by processor circuitry, a detection process that includes detecting a measurement target from among a distance image obtained by two-dimensional scanning of a scan angle range with laser light, the detected measurement target being a moving object;

executing, by the processor circuitry, a calculating process that includes obtaining a distance between the apparatus and a position of the detected measurement target, obtaining a bearing angle from the apparatus to the detected measurement target, and calculating a scan angle range and a shift value of the scan angle range in accordance with the obtained distance and the obtained bearing angle, the calculating of the scan angle range being configured to calculate the scan angle range such that sampling density within the scan angle range is equal or higher than a certain value, the calculating of the shift value being configured to calculate the shift value such that the detected measurement object is included in a center of the calculated scan angle range; and executing, by the processor circuitry, a changing process that includes updating an operation parameter in the two-dimensional scanning by using the calculated scan angle range and the calculated shift value, thereby the distance image obtained by the two-dimensional scanning based on the updated operation parameter includes the measurement target even if a position of the measurement target has been changed.

9. The method according to claim 8,
wherein the changing process includes shifting a center of the scan angle range with the laser light based on the bearing angle or an estimated position of the measurement target.

10. The method according to claim 9,
wherein the changing process includes, when the sampling density is lower than the sampling density having a certain value or higher in a maximum scan angle range with the laser light, setting the scan angle range to the maximum scan angle range.

11. The method according to claim 10,
wherein the changing process includes, when the scan angle range is the maximum scan angle range and the sampling density exceeds a threshold value, controlling light emission timing of the laser light so that the sampling density is lower than or equal to the threshold value.

12. The method according to claim 10,
wherein the changing process includes, when the scan angle range is the maximum scan angle range and the sampling density exceeds a threshold value, decimating a result of measurement so that the sampling density is lower than or equal to the threshold value.

13. The method according to claim 8,
wherein the changing process includes calculating the bearing angle based on distance data measured through the scanning with the laser light and mirror angle data for a scanning mirror that deflects the laser light.

14. The method according to claim 8,
wherein the processor is configured to execute an imaging process, the imaging process including acquiring an image captured by a camera having an angle of view wider than the scan angle range, and wherein the changing process includes calculating the bearing angle based on distance data measured through the scanning with the laser light and the image captured by the camera having the angle of view wider than the scan angle range.

15. A non-transitory computer-readable storage medium storing a program that causes processor circuitry to execute a process for distance measurement, the process comprising:
- executing a detection process that includes detecting a measurement target from among a distance image obtained by through two-dimensional scanning of a scan angle range with laser light, the detected measurement target being a moving object;
- executing a calculating process that includes
  - obtaining a distance between the apparatus and a position of the detected measurement target,
  - obtaining a bearing angle from the apparatus to the detected measurement target, and
  - calculating a scan angle range and a shift value of the scan angle range in accordance with the obtained distance and the obtained bearing angle, the calculating of the scan angle range being configured to calculate the scan angle range such that sampling density within the scan angle range is equal or higher than a certain value, the calculating of the shift value being configured to calculate the shift value such that the detected measurement object is included in a center of the calculated scan angle range; and
- executing a changing process that includes updating an operation parameter in the two-dimensional scanning by using the calculated scan angle range and the calculated shift value, thereby the distance image obtained by the two-dimensional scanning based on the updated operation parameter includes the measurement target even if a position of the measurement target has been changed.

16. The non-transitory computer-readable storage medium according to claim 15,
- wherein the changing process includes shifting a center of the scan angle range with the laser light based on the bearing angle or an estimated position of the measurement target.

17. The non-transitory computer-readable storage medium according to claim 16,
- wherein the changing process includes, when the sampling density is lower than the sampling density having a certain value or higher in a maximum scan angle range with the laser light, setting the scan angle range to the maximum scan angle range.

18. The non-transitory computer-readable storage medium according to claim 17,
- wherein the changing process includes, when the scan angle range is the maximum scan angle range and the sampling density exceeds a threshold value, controlling light emission timing of the laser light so that the sampling density is lower than or equal to the threshold value.

19. The non-transitory computer-readable storage medium according to claim 17,
- wherein the changing process includes, when the scan angle range is the maximum scan angle range and the sampling density exceeds a threshold value, decimating a result of measurement so that the sampling density is lower than or equal to the threshold value.

20. The non-transitory computer-readable storage medium according to claim 15,
- wherein the changing process includes calculating the bearing angle based on distance data measured through the scanning with the laser light and mirror angle data for a scanning mirror that deflects the laser light.

* * * * *